United States Patent
Umehara et al.

(10) Patent No.: US 7,583,479 B2
(45) Date of Patent: Sep. 1, 2009

(54) THIN-FILM MAGNETIC HEAD WITH HEATER IN OVERCOAT MULTILAYER, HEAD GIMBAL ASSEMBLY WITH THIN-FILM MAGNETIC HEAD, AND MAGNETIC DISK DRIVE APPARATUS WITH HEAD GIMBAL ASSEMBLY

(75) Inventors: Tsuyoshi Umehara, Tokyo (JP); Norikazu Ota, Tokyo (JP); Katsumichi Tagami, Tokyo (JP); Hiroki Matsukuma, Tokyo (JP); Nobuya Oyama, Tokyo (JP); Soji Koide, Tokyo (JP); Yoshiyuki Mizoguchi, Tokyo (JP); Kazuhide Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 476 days.

(21) Appl. No.: 11/128,305

(22) Filed: May 13, 2005

(65) Prior Publication Data
US 2005/0270694 A1    Dec. 8, 2005

(30) Foreign Application Priority Data

Jun. 4, 2004   (JP)   ............ 2004-167266
Mar. 31, 2005  (JP)   ............ 2005-102637

(51) Int. Cl.
*G11B 5/33*   (2006.01)
*G11B 5/127*  (2006.01)
*G11B 5/147*  (2006.01)

(52) U.S. Cl. ................... 360/320; 360/125.73
(58) Field of Classification Search ........... 360/234.7, 360/235.7, 236.5, 125.72, 125.73, 320, 123.25, 360/123.46, 123.58, 123.28, 123.29, 123.49, 360/123.5

See application file for complete search history.

(56) References Cited

U.S. PATENT DOCUMENTS

| 5,296,993 | A | * | 3/1994 | Aboaf et al. | ........... 360/125.42 |
| 5,559,653 | A | * | 9/1996 | Shouji et al. | ........... 350/125.63 |
| 5,880,915 | A | * | 3/1999 | Lee et al. | ............... 360/125.52 |
| 5,991,113 | A | * | 11/1999 | Meyer et al. | ................... 360/75 |

(Continued)

FOREIGN PATENT DOCUMENTS

JP    1-317208    12/1989

(Continued)

OTHER PUBLICATIONS

"Materials—Aluminum Oxide (Al2O3) Properties" http://www.accuratus.com/alumox.html.*
"Materials—Fused Silica (SiO2) Properties" http://www.accuratus.com/fused.html.*

*Primary Examiner*—Brian E Miller
*Assistant Examiner*—Adam B Dravininkas
(74) *Attorney, Agent, or Firm*—Oblon, Spivak, McClelland, Maier & Neustadt, P.C.

(57) ABSTRACT

A thin-film magnetic head according to the present invention comprises: a substrate; at least one magnetic head element formed on the substrate; an overcoat multilayer composed of a plurality of overcoat layers, formed on the substrate so as to cover the at least one magnetic head element; and at least one heating element to be heated at least during operation of the at least one magnetic head element, the at least one heating element provided in the overcoat multilayer, and a coefficient of thermal expansion of an overcoat layer located farthest from the substrate in the overcoat multilayer being smaller than a coefficient of thermal expansion of an overcoat layer located closest to the substrate in the overcoat multilayer.

32 Claims, 13 Drawing Sheets

U.S. PATENT DOCUMENTS

| | | | |
|---|---|---|---|
| 6,747,841 B1 * | 6/2004 | Olim et al. | 360/125.39 |
| 6,760,191 B1 * | 7/2004 | Yan et al. | 360/128 |
| 6,859,343 B1 * | 2/2005 | Alfoqaha et al. | 360/125.72 |
| 7,035,046 B1 * | 4/2006 | Young et al. | 360/125.75 |
| 7,123,447 B2 * | 10/2006 | Pendray et al. | 360/234.7 |
| 7,212,380 B2 * | 5/2007 | Hsiao et al. | 360/125.12 |
| 2003/0099054 A1 * | 5/2003 | Kamijima | 360/59 |
| 2003/0174430 A1 | 9/2003 | Takahashi et al. | |
| 2004/0165312 A1 * | 8/2004 | Koide et al. | 360/128 |
| 2004/0201920 A1 * | 10/2004 | Koide et al. | 360/128 |
| 2005/0047016 A1 * | 3/2005 | Koide et al. | 360/234.5 |
| 2005/0237666 A1 * | 10/2005 | Hsiao et al. | 360/126 |

FOREIGN PATENT DOCUMENTS

| | | | |
|---|---|---|---|
| JP | 4-366408 | | 12/1992 |
| JP | 5-20635 | | 1/1993 |
| JP | 2003-168274 | | 6/2003 |
| JP | 2003-331406 | | 11/2003 |
| JP | 2003331406 | A * | 11/2003 |
| JP | 2004-192665 | | 7/2004 |
| WO | WO 02/37480 A1 | | 5/2002 |

* cited by examiner

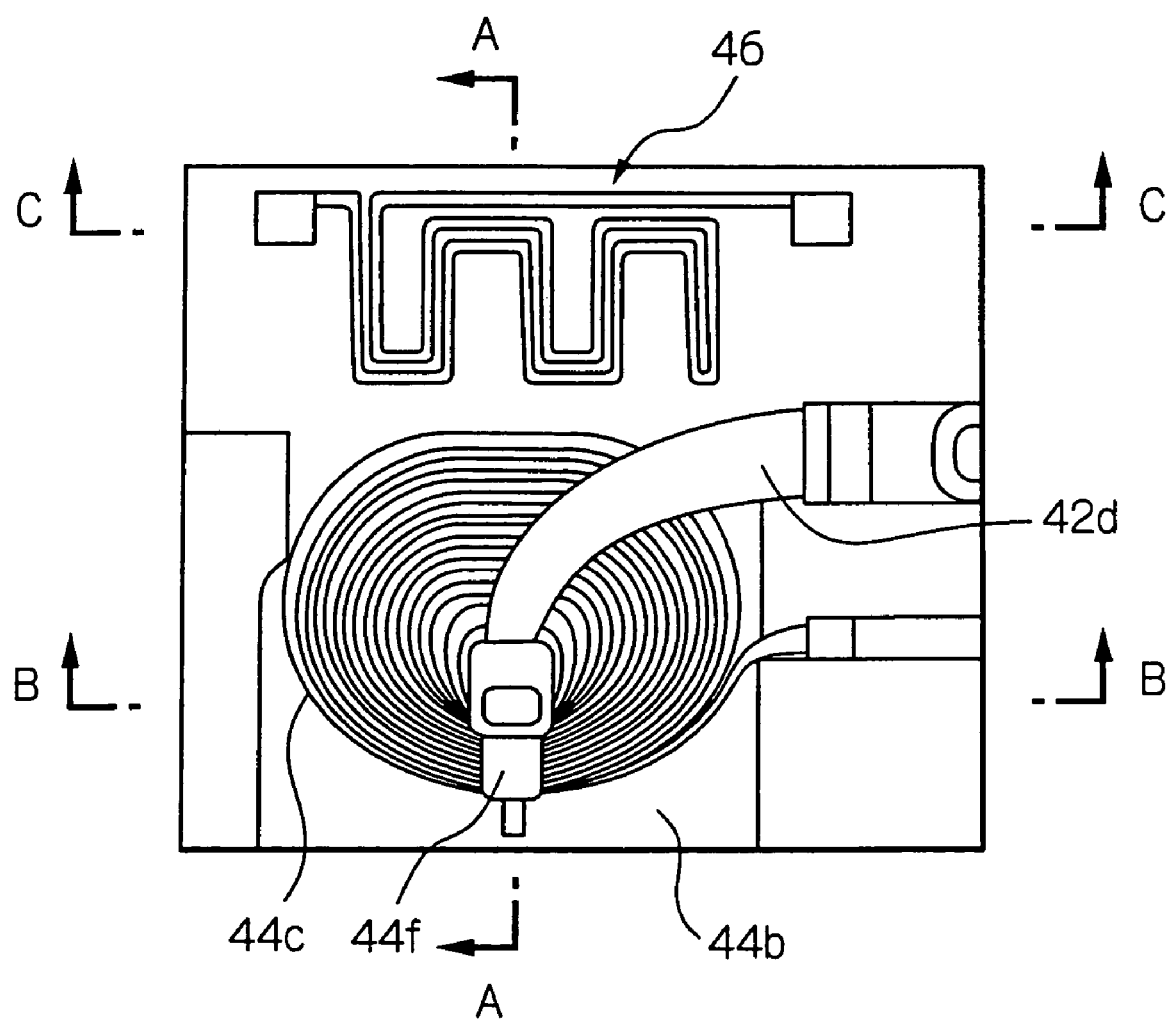

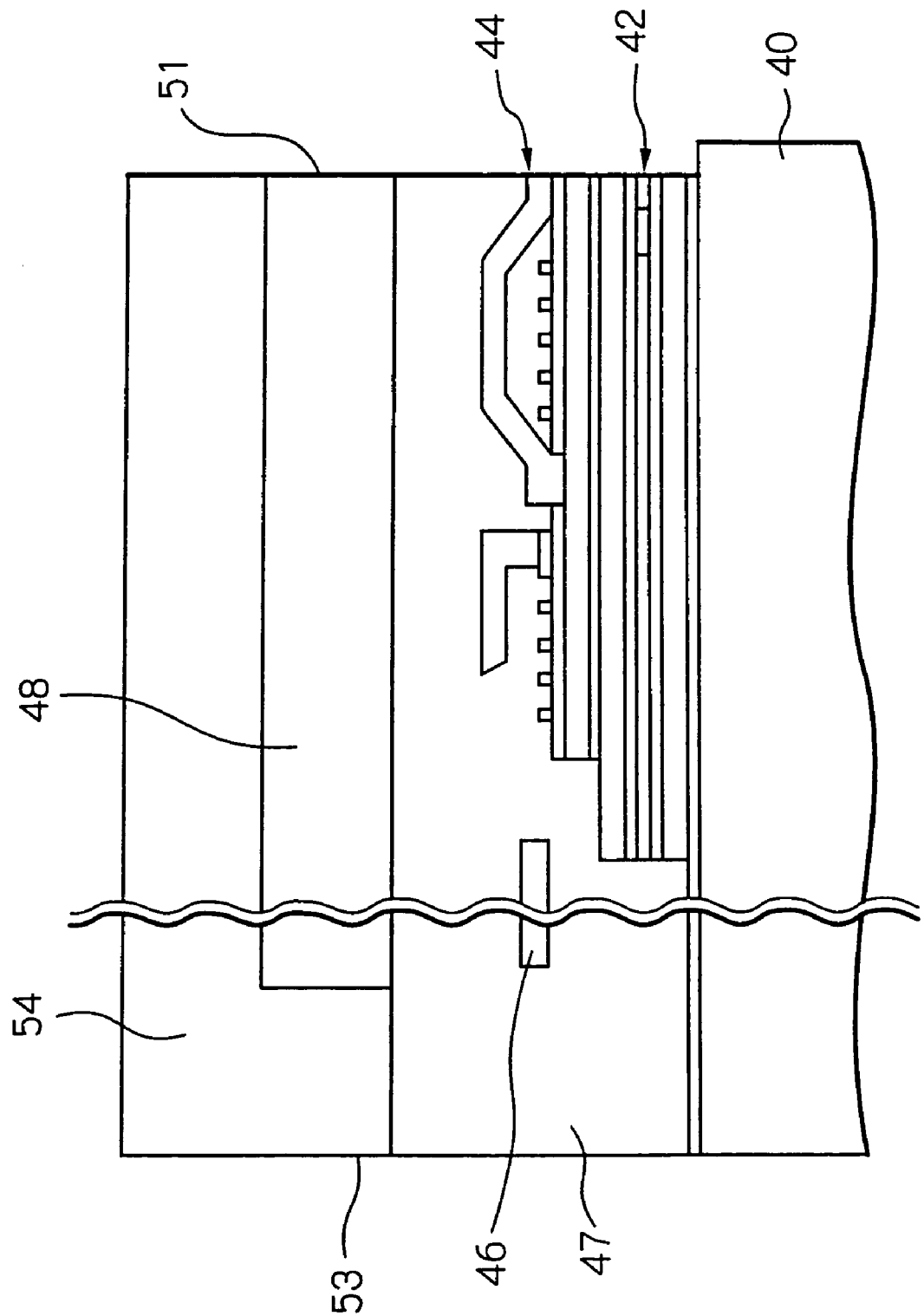

THIN-FILM MAGNETIC HEAD WITH HEATER IN OVERCOAT MULTILAYER, HEAD GIMBAL ASSEMBLY WITH THIN-FILM MAGNETIC HEAD, AND MAGNETIC DISK DRIVE APPARATUS WITH HEAD GIMBAL ASSEMBLY

PRIORITY CLAIM

This application claims priorities from Japanese patent application No. 2004-167266, filed on Jun. 4, 2004 and Japanese patent application No. 2005-102637, filed on Mar. 31, 2005, which are incorporated herein by reference.

BACKGROUND OF THE INVENTION

1. Field of the Invention

The present invention relates to a thin-film magnetic head with a heater in an overcoat multilayer, a head gimbal assembly (HGA) with the thin-film magnetic head and a magnetic disk drive apparatus with the HGA.

2. Description of the Related Art

In a magnetic disk drive apparatus, a thin-film magnetic head writes and reads signals to/from a magnetic disk that is rotated by a spindle motor. The thin-film magnetic head has an inductive write head element and a magnetoresistive (MR) effect read head element formed on a slider substrate fixed at an end portion of an suspension of a HGA. During writing or reading signals, the thin-film magnetic head is driven to a desired position on the magnetic disk by a swingable arm.

When writing or reading signals, the thin-film magnetic head hydrodynamically flies with predetermined magnetic spacing ($d_{MS}$) on the rotating magnetic disk. While flying on the disk, the thin-film magnetic head writes signals to the magnetic disk using a magnetic field generated from the inductive write head element and reads signals by sensing magnetic fields corresponding to the signals from the magnetic disk through an MR effect element.

With the increasing data storage capacity and density of a magnetic disk drive apparatus in recent years, a track width of the thin-film magnetic head is becoming smaller. When the track width is reduced, the writing and reading performance of this magnetic head element is reduced. In order to avoid this problem, latest magnetic disk drive apparatuses have a tendency to reduce $d_{MS}$. This takes advantage of the fact that magnetic fields corresponding to signals which reaches the thin-film magnetic head from the magnetic disk increases as $d_{MS}$ decreases. The value of $d_{MS}$ is actually designed to be reduced down to the order of 10 nm.

However, during writing signals, Joule heat from the coil layer within an inductive write head element and heat caused by eddy-current loss from the upper and lower pole layers are generated. This heat produces a TPTP (Thermal Pole Tip Protrusion) phenomenon in which an overcoat layer is expanded by heat and the magnetic head element is protruded toward the magnetic disk surface. In this case, the head end face (Pole Tip Recess (PTR) surface) on the same side of the air bearing surface, which is reached by the edges of these magnetic head elements, swells in a shape which is curved toward the magnetic disk surface. As a result, when the designed value of $d_{MS}$ is very small, the protruding MR effect element may contact the magnetic disk surface and frictional heat produced by the contact may cause the electrical resistance value of the MR effect element to change, producing an abnormal signal (thermal asperity).

To avoid this thermal asperity, methods of providing a heater in the vicinity of the magnetic head element to posi- tively generate a TPTP phenomenon and controlling $d_{MS}$ are developed (e.g., U.S. Pat. No. 5,991,113 and U.S. patent Publications Nos. 2003/99054 and 2003/174430). All these methods cause the heater to generate heat by applying electrical currents, expand the overcoat layer and magnetic head element by this heat and positively bring them closer to the magnetic disk surface. The $d_{MS}$ value is controlled by the amount of the electrical currents.

Here, the thin-film magnetic head provided with such a heater is likely to bring about crashes due to the swelling of the overcoat layer. Actually, when a TPTP phenomenon is positively generated by heat from the heater, the PTR surface of the overcoat layer opposite to the slider substrate in relation of the magnetic head element swells more than the PTR surface in the vicinity of the magnetic head element, and especially the portion of the PTR surface close to the trailing edge is likely to swell most. As a result, despite the fact that $d_{MS}$ which is the distance between the end of the magnetic head element and the magnetic disk surface is secured within a predetermined value, the swelling portion of the PTR surface close to the trailing edge may contact the magnetic disk surface, producing crashes and causing damage to the magnetic disk surface and thin-film magnetic head.

To avoid the crashes, there is a method of further recessing the portion close to the trailing edge of the PTR surface. Furthermore, as another method, for example, Japanese Patent Publication No. 04-366408A discloses a thin-film magnetic head whose PTR surface includes a dent. Through this dent, this thin-film magnetic head prevents the portion close to the trailing edge from swelling more than the PTR surface in the vicinity of the magnetic head element even when heated. This makes it possible to avoid crashes.

However, even if the method of further recessing the portion close to the trailing edge of the PTR surface is used, it is difficult to sufficiently suppress the positively generated swelling of the portion close to the trailing edge, depending on the state in which the heater is heated. Furthermore, the method of manufacturing a thin-film magnetic head described in Japanese Patent Publication No. 04-366408A polishes the magnetic head element under a predetermined heating condition so that the PTR surface becomes flat, or mechanically grinds or etches it to the depth corresponding to the amount of swelling due to thermal expansion. Therefore, according to this manufacturing method, the processed parts are quite minute and the amount of grinding or etching is also a very small quantity, and therefore it is unavoidable to produce a large processing variation. As a result, the swelling shape of the processed PTR surface varies from one head to another, resulting in a problem that it is difficult to stably avoid the crashes. Furthermore, the process such as polishing with quite high accuracy is applied after the entire thin-film magnetic head is formed, which increases manufacturing man-hours considerably. There is also another problem that minute shavings, etc., produced during the process may be stuck to the PTR surface, causing an adverse effect on the head operation.

Moreover, processing the PTR surface alone cannot live up to an expectation for an improvement on a degree of the swelling in the PTR surface per the amount of heat from the heater, that is, thermal efficiency in generating a TPTP phenomenon. Actually, depending on the amount of process and its position, there can be a case where an extra heat is required compared to the surface before the process to realize the shape of the PTR surface having a predetermined amount of swelling. Thus, when the thermal efficiency is not sufficiently good, it is necessary to increase the amount of heat generated by the heater to produce a predetermined TPTP phenomenon.

As a result, the amount of heat propagating from the heater to the MR effect element increases, causing a decrease in the reading performance in the MR effect element having high temperature dependency of output.

BRIEF SUMMARY OF THE INVENTION

Therefore, it is an object of the present invention to provide a thin-film magnetic head with a heater capable of reducing $d_{MS}$ to a small value and reliably and stably avoiding crashes between portions close to the trailing edge and the magnetic disk surface by controlling the swelling shape of the PTR surface with high thermal efficiency while suppressing manufacturing variations, an HGA provided with this thin-film magnetic head and a magnetic disk drive apparatus provided with this HGA.

The present invention provides a thin-film magnetic head comprising: a substrate; at least one magnetic head element formed on the substrate; an overcoat multilayer composed of a plurality of overcoat layers, formed on the substrate so as to cover the at least one magnetic head element; and at least one heating element to be heated at least during operation of the at least one magnetic head element, the at least one heating element provided in the overcoat multilayer, and a coefficient of thermal expansion of an overcoat layer located farthest from the substrate in the overcoat multilayer being smaller than a coefficient of thermal expansion of an overcoat layer located closest to the substrate in the overcoat multilayer.

Since the heater is provided in the overcoat multilayer, heat from the heater heats each overcoat layer efficiently. Furthermore, the coefficient of thermal expansion of the overcoat layer located farthest from the slider substrate is smaller than the coefficient of thermal expansion of the overcoat layer located closest to the slider substrate. Therefore, when the heater gives a predetermined amount of heat to the overcoat multilayer, it is possible to make the swelling of the overcoat layer farthest from the slider substrate, that is, the overcoat layer including portions close to the trailing edge, in the direction toward the magnetic disk surface smaller than the swelling of the overcoat layer closest to the slider substrate.

Furthermore, the magnetic head element portion reached to the PTR surface is protruded in the direction toward the magnetic disk surface accompanying the swelling of the overcoat layer closest to the slider substrate. This overcoat layer has a greater coefficient of thermal expansion than that of the overcoat layer including portions close to the trailing edge, and therefore its swelling is greater than that of a conventional overcoat layer having a uniform coefficient of thermal expansion. This improves the thermal efficiency when a TPTP phenomenon is generated.

Through this improvement of the thermal efficiency, the amount of power supplied to the heater can be reduced. This makes it possible to reduce the amount of heat reaching the MR effect elements as the total amount of heat decreases and thereby prevent the reading performance from degrading due to a temperature rise of the MR effect elements. This also improves the reliability of the thin-film magnetic head and magnetic disk drive apparatus.

Furthermore, since the overcoat multilayer is only formed, any process such as polishing with very high precision is not required for the PTR surface near the magnetic head element. Therefore, the increment in manufacturing man-hours can be reduced and a variation in the characteristic among heads is also reduced considerably. This makes it possible to reduce the manufacturing cost of the thin-film magnetic head.

Using the above described means allows the swelling shape of the PTR surface to be controlled with high thermal efficiency while suppressing a manufacturing variation, and can thereby avoid crashes between the portions close to the trailing edge and the magnetic disk surface reliably and stably while suppressing $d_{MS}$ to a small value, which would be conventionally hard to be realized.

A coefficient of thermal expansion of any of the overcoat layers is preferably equal to or greater than a coefficient of thermal expansion of an overcoat layer adjacent to one layer surface farther from the substrate compared to the other surface in the above any of said overcoat layers. In this case, the coefficient of thermal expansion of each overcoat layer decreases sequentially and monotonously as the distance from the slider substrate increases. Therefore, when the heater gives a predetermined amount of heat to the overcoat multilayer, it is possible to set the swelling of an arbitrary overcoat layer in the direction toward the magnetic disk surface so as not to exceed the swelling of the overcoat layer closer to the slider substrate than the arbitrary overcoat layer. Moreover, it is possible to minimize the amount of swelling in portions close to the trailing edge. As a result, it is possible to avoid crashes between the portions close to the trailing edge and the magnetic disk surface more reliably and efficiently.

The overcoat layers are preferably stacked in descending order of coefficients of thermal expansion from the substrate side in the overcoat multilayer. In this case, the coefficient of thermal expansion of each overcoat layer decreases sequentially as the distance from the slider substrate increases. Therefore, when the heater gives a predetermined amount of heat to the overcoat multilayer, the swelling of each overcoat layer in the direction toward the magnetic disk surface decreases as the distance from the slider substrate increases and the amount of swelling of the portions close to the trailing edge reaches a minimum. As a result, it is possible to avoid crashes between the portions close to the trailing edge and the magnetic disk surface much more reliably and efficiently.

Each of the overcoat layers is formed of one material selected from a group made up of MgO, $Al_2O_3$, Mo, W, AlN, SiC, W-Cu, $SiO_2$, Si, $Si_3N_4$, SiAlON, $AlTiO_4$, BN and $ZrW_2O_8$. In this group, the materials are arranged in descending order of coefficients of thermal expansion. Therefore, it is possible to select a material in such a way that the coefficient of thermal expansion of one overcoat layer exceeds the coefficient of thermal expansion of the overcoat layer adjacent to one layer surface farther from the slider substrate compared to the other layer surface in the above one overcoat layer. As a result, it is possible to avoid crashes for the above-described reasons.

The overcoat multilayer is preferably made up of two overcoat layers. Furthermore, the overcoat multilayer is also preferably made up of three overcoat layers.

The at least one heater is preferably provided in an overcoat layer closest to the substrate in the overcoat multilayer. Here, this at least one heater is more preferably provided at a position opposite to an air bearing surface in relation to said at least one magnetic head element.

Furthermore, the at least one heating element is preferably provided in an overcoat layer second closest to the substrate in the overcoat multilayer. Furthermore, the at least one heating element is provided in an overcoat layer third closest to the substrate in the overcoat multilayer.

The at least one magnetic head element preferably includes a current in plane (CIP) giant magnetoresistive (GMR) effect element, current perpendicular to plane (CPP) GMR effect element or a tunnel magnetoresistive (TMR) effect element. All of the CIP-GMR effect element, CPP-GMR effect element and TMR effect element have very high magnetic field sensitivity, but their output strongly depends on temperature.

Using these elements as the reading magnetic head elements of the thin-film magnetic head according to the present invention makes it possible to prevent deterioration of the reading performance due to thermal asperity and heat from the heater, stably avoid crashes and effectively use high magnetic field sensitivity that these elements have.

The present invention further provides an HGA comprising the above described thin-film magnetic head, trace conductors for transmitting signals to/from the at least one magnetic head element of the thin-film magnetic head, lead wires for supplying currents to the at least one heating element of the thin-film magnetic head, and a support mechanism supporting the thin-film magnetic head.

The present invention further provides a magnetic disk drive apparatus comprising at least one of the above-described HGA and a current control means for controlling currents to be supplied to the at least one heating element.

Preferably, this current control means is a control means for supplying currents to the at least one heating element at least during operation of the at least one magnetic head element.

This current control means preferably comprises a signal system for controlling the at least one heating element, and the signal system controls currents supplied to the at least one heating element independently from operations of a signal system for controlling operations of the at least one magnetic head element. Thus, providing the signal system for controlling the heater independently from the signal system for controlling recording/reproducing operations makes it possible to realize not only a current application to the heater linked with recording/reproducing operations but also a variety of current-application modes.

The current control means preferably comprises a detecting means for detecting an acoustic emission (AE) component included in a reproduced data signal from the magnetic head element and preferably controls currents supplied to the at least one heating element according to the amount of the AE component detected by the detecting means. It is possible to know the extent/frequency of contact between the thin-film magnetic head and the magnetic disk surface by monitoring the AE component. Therefore, it is possible to avoid crashes between the thin-film magnetic head and the magnetic disk surface by controlling currents supplied to the heater according to the amount of this AE detection and adjusting the TPTP phenomenon.

This current control means preferably comprises a temperature detecting means for detecting a temperature inside the magnetic disk drive apparatus and preferably controls currents supplied to the at least one heating element according to an degree of the temperature detected by the temperature detecting means. The value of $d_{MS}$ is generally affected by the temperature inside the magnetic disk drive apparatus. Therefore, it is possible to keep the $d_{MS}$ value constant and obtain a stable writing/reading characteristic by controlling currents supplied to the heater according to this detected temperature.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIG. 5 is a plain view illustrating a schematic structure of the thin-film magnetic head according to the embodiment in FIG. 4 viewed through from the side of the element-formed surface of the slider substrate;

FIG. 7 is a sectional view showing a countermeasure in the case where overcoat layers are insufficiently adhered to one another;

DETAILED DESCRIPTION OF THE INVENTION

Figure 1:
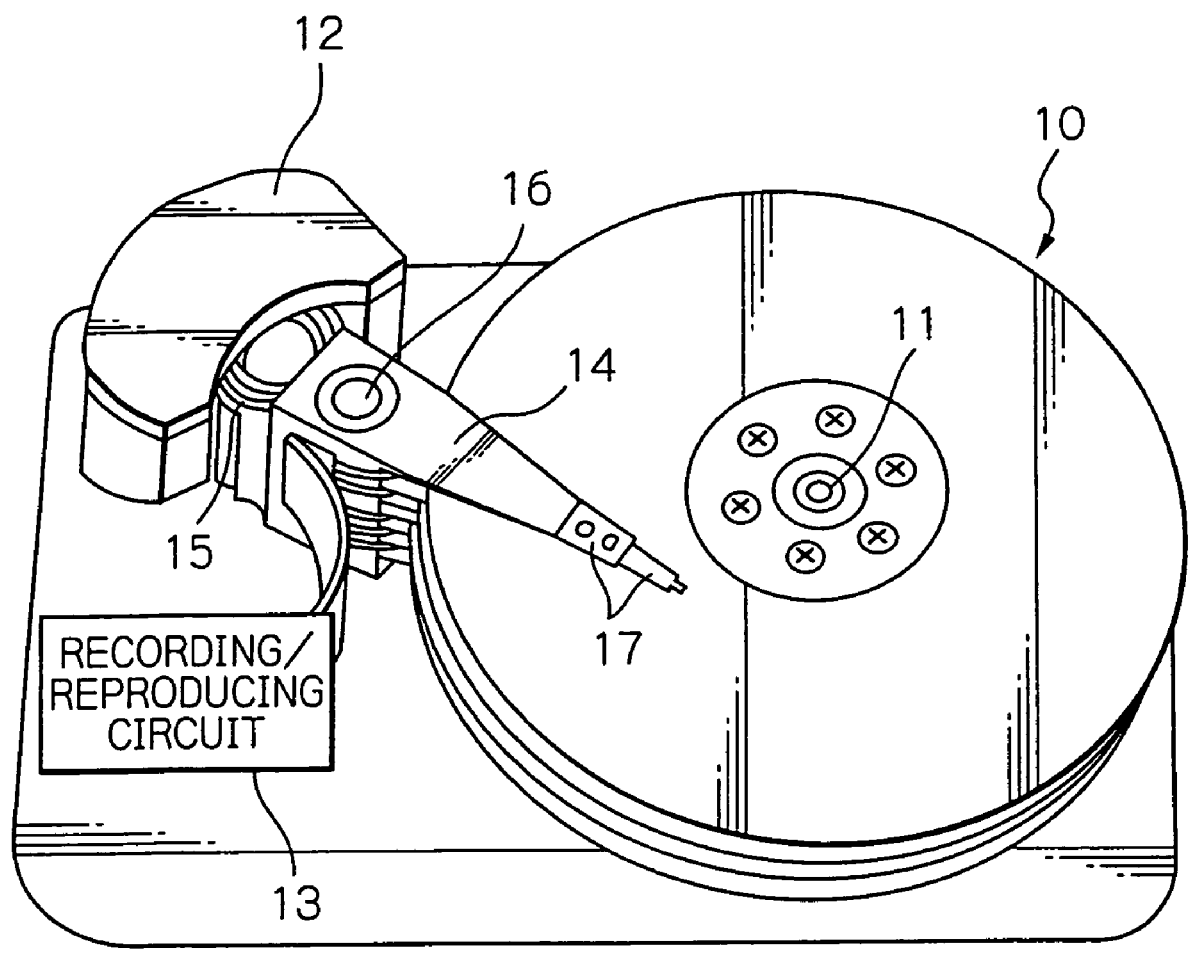
FIG. 1 is a perspective view schematically showing the constitution of main components of a magnetic disk drive apparatus according to an embodiment of the present invention.
Figure 2:
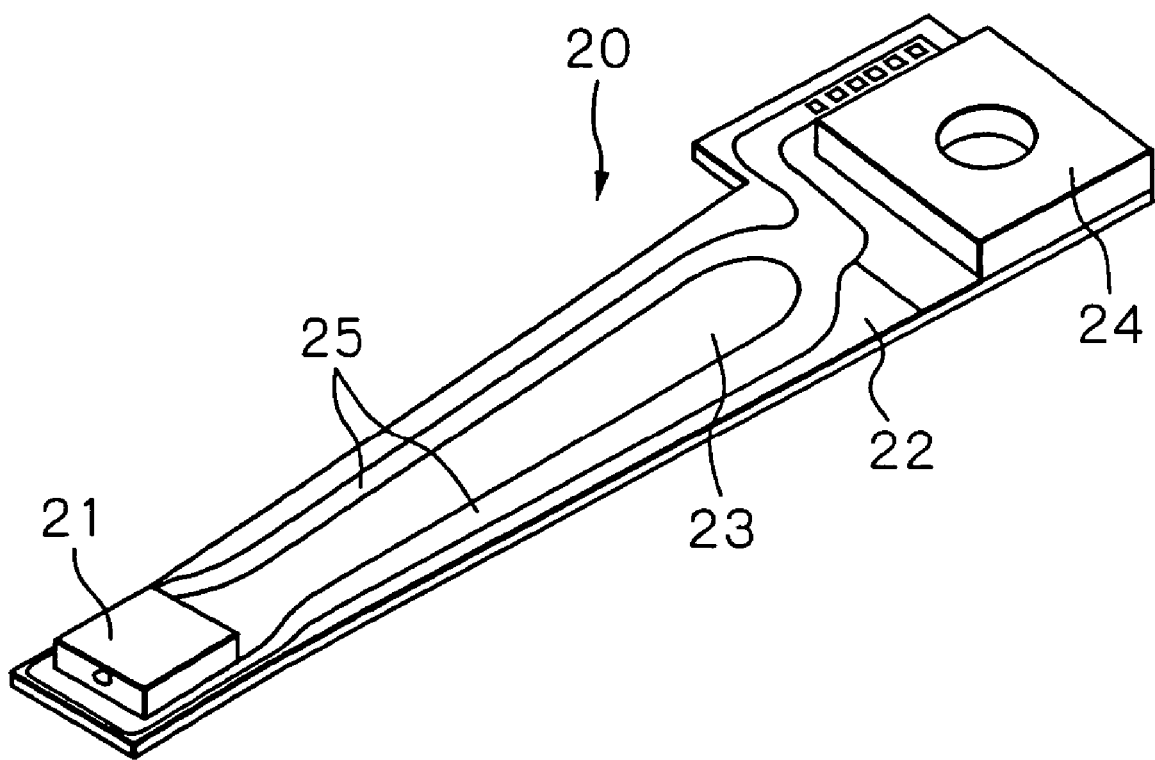
FIG. 2 is a perspective view showing the whole of an HGA according to the embodiment in FIG. 1.
Figure 3:
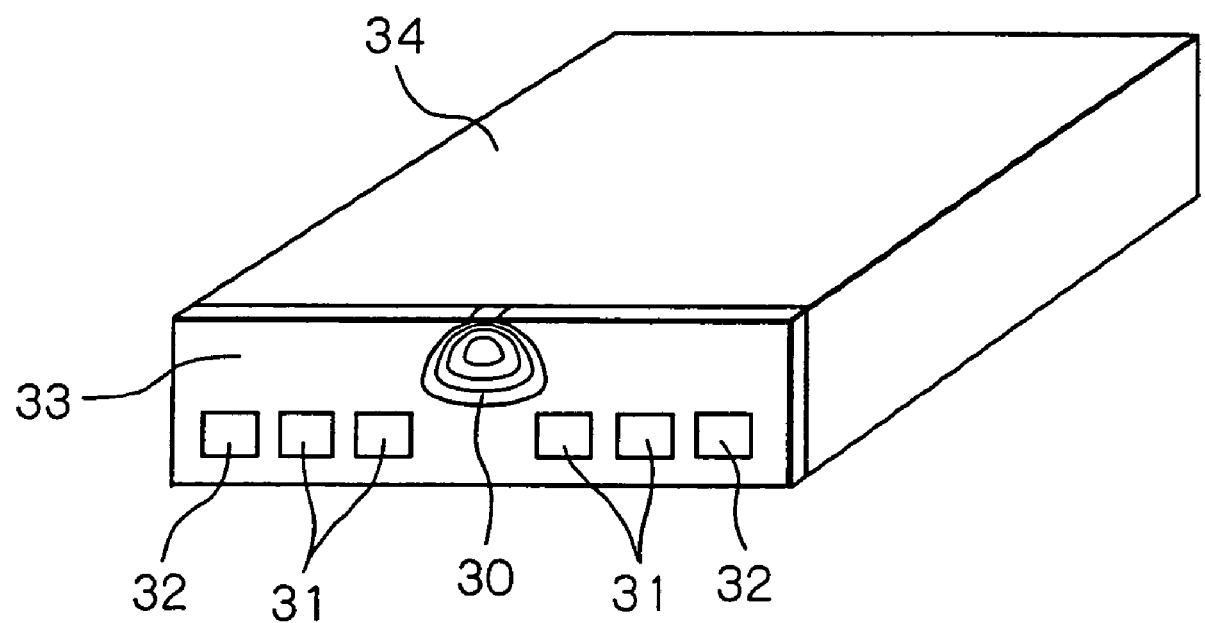
FIG. 3 is a perspective view of a thin-film magnetic head mounted at an end portion of the HGA according to the embodiment in FIG. 1.

FIG. 1 is a perspective view schematically showing the constitution of main components of a magnetic disk drive apparatus according to an embodiment of the present invention, FIG. 2 is a perspective view showing the whole of an HGA and FIG. 3 is a perspective view of a thin-film magnetic head (slider) mounted at an end portion of the HGA.

In FIG. 1, reference numeral 10 denotes a plurality of magnetic disks rotating around a rotational axis 11 of a spindle motor, 12 denotes an assembly carriage device for positioning a thin-film magnetic head (slider) on a track, 13 denotes a recording and reproducing circuit for controlling read/write operations and heat operations of the thin-film magnetic head.

The assembly carriage device 12 is provided with a plurality of drive arms 14. These drive arms 14 are rotatable around a pivot bearing axis 16 through a voice coil motor (VCM) 15 and stacked in the direction along this axis 16. An HGA 17 is provided at an end portion of each drive arm 14. Each HGA 17 is provided with a slider in such a way as to face the surface of each magnetic disk 10. The each number of the magnetic disks 10, the drive arms 14, the HGAs 17 and the thin-film magnetic heads (sliders) can also be only one.

As shown in FIG. 2, the HGA is constructed by fixing a slider 21 having a magnetic head element at an end portion of a suspension 20 and electrically connecting one end of a wiring member 25 to signal electrodes of the slider 21.

The suspension 20 is mainly constructed of a load beam 22, a flexure 23 with elasticity fixed and supported to this load beam 22, a base plate 24 provided at the base of the load beam 22 and the wiring member 25 provided on the flexure 23, which is made up of trace conductors and connection pads electrically connected to both ends thereof.

It is obvious that the suspension structure of the HGA of the present invention is not limited to the above-described structure. Though not shown in the figure, it is also possible to attach a head drive IC chip at some midpoint of the suspension 20.

As shown in FIG. 3, the slider according to this embodiment is provided with a write magnetic head element and a read magnetic head element 30, four signal electrodes 31 connected to these elements and two drive electrodes 32 for flowing currents through a heater which is not shown in FIG. 3, all of which are formed on the side of an element-formed surface 33. Reference numeral 34 denotes an air bearing surface of the slider. The number and positions of the signal electrodes are not limited to the mode in FIG. 3. In FIG. 3, there are six signal electrodes, but it is also possible to provide five electrodes and a ground connecting to the slider substrate.

Figure 4:
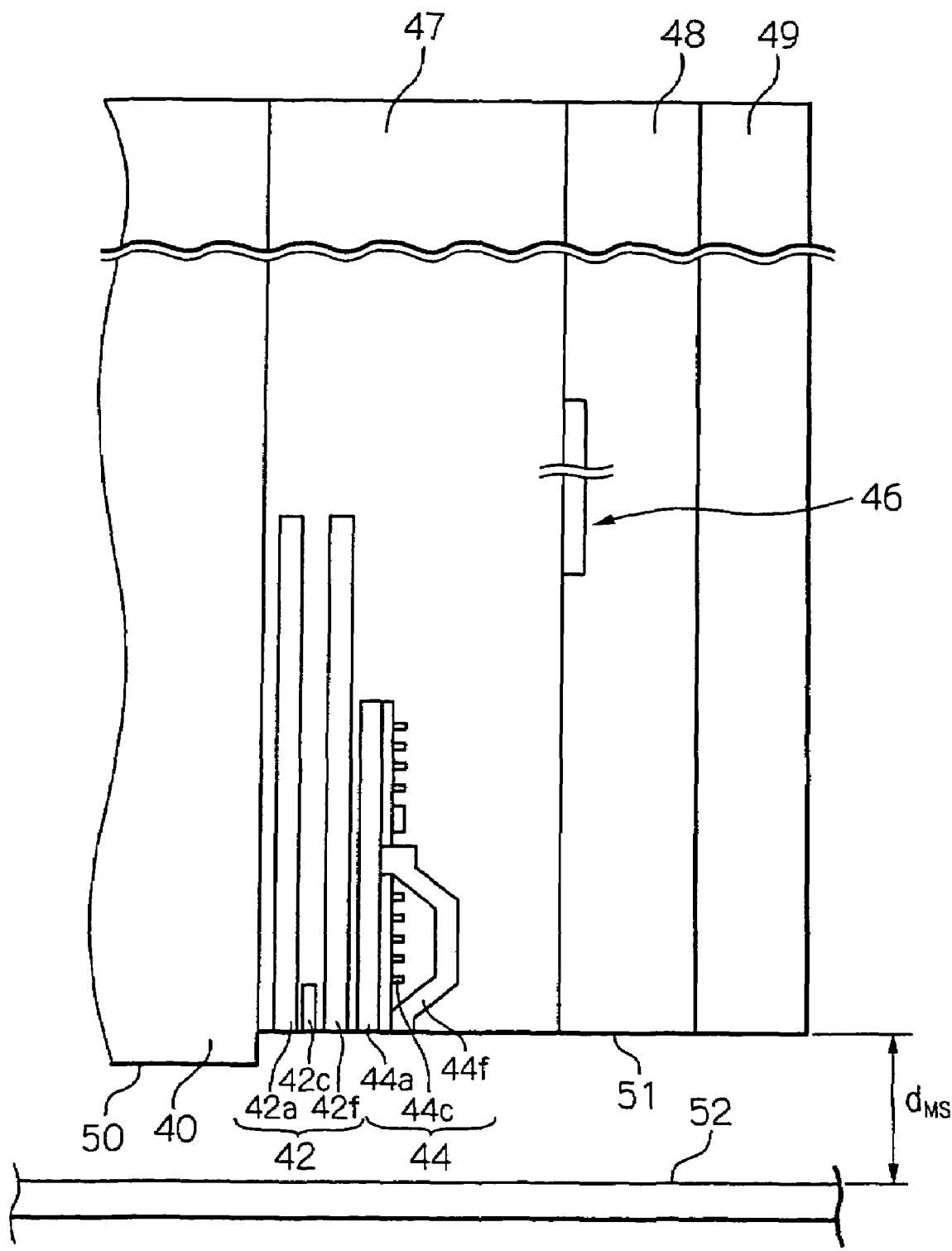
FIG. 4 is a sectional view illustrating a schematic structure of the thin-film magnetic head according to an embodiment of the present invention.

FIG. 4 is a sectional view illustrating a schematic structure of the thin-film magnetic head according to an embodiment of the present invention. The figure does not show a recessed surface formed on the PTR surface close to the trailing edge, but a predetermined recessed surface may be formed.

In the figure, the slider substrate 40 has an air bearing surface 50 and flies hydrodynamically over the surface of a rotating magnetic disk 52 with a predetermined space during a write or read operation. A read MR effect element 42 and an inductive write head element 44, a first overcoat layer 47, a second overcoat layer 48 and a third overcoat layer 49 which constitute an overcoat multilayer that covers these elements are formed on one side surface (element-formed surface) of the slider substrate 40 when the air bearing surface of the slider substrate 40 is set to a bottom.

The MR effect element 42 includes an MR layer 42c, and a lower shield layer 42a and an upper shield layer 42f disposed at positions sandwiching this MR layer. The MR layer 42c includes a CIP-GMR multilayer, a CPP-GMR multilayer or a TMR multilayer and senses magnetic fields corresponding to signals with very high sensitivity. The lower shield layer 42a and upper shield layer 42f are magnetic layers and play the role of shielding an external magnetic field which causes noise to the MR layer 42c. The inductive write head element 44 includes a lower pole layer 44a, an upper pole layer 44f and a coil layer 44c. The lower pole layer 44a and upper pole layer 44f are magnetic paths to converge and guide magnetic flux generated from the coil layer 44c up to the magnetic disk surface 52 onto which data is written.

The ends of the MR effect element 42 and the inductive write head element 44 facing the magnetic disk surface 52 extend to the PTR surface 51. The PTR surface 51 is provided with a coating such as diamond like carbon (DLC) as a protective film. Here, the distance between the PTR surface around the end of the magnetic head element and the magnetic disk surface 52 during operations of the magnetic head element is $d_{MS}$.

The heater 46 is formed on the first overcoat layer 47, and positioned in the second overcoat layer 48. A third overcoat layer 49 is formed on the second overcoat layer 48 that is formed on the first overcoat layer 47.

The overcoat multilayer may be formed of two layers or more-than-three layers. The coefficient of thermal expansion of any overcoat layer is equal to or greater than the coefficient of thermal expansion of the overcoat layer adjacent to one layer surface farther from the slider substrate compared to the other layer surface in the any overcoat layer, and the material of each layer is selected in such a way that the coefficient of thermal expansion of each overcoat layer decreases sequentially and monotonously from the slider substrate side. As will be described later, this can suppress the swelling of the portion close to the trailing edge due to a TPTP phenomenon which may cause crashes.

Furthermore, the heater 46 need not necessarily be located as shown in FIG. 4 and can be located, for example, in the first overcoat layer 47 or in the second overcoat layer 48 where the heater 46 does not contact the first overcoat layer 47. The heater 46 can also be located in the third or subsequent overcoat layer.

Figure 6A:
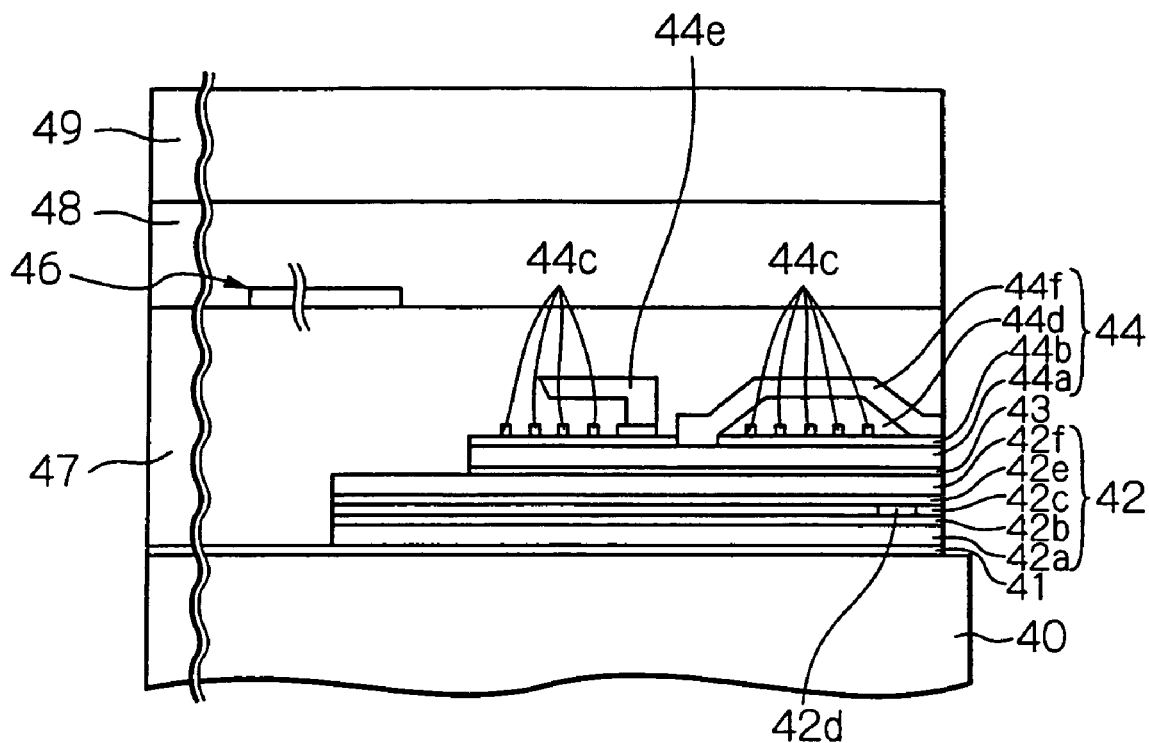
FIGS. 6a and 6b are sectional views along a line A-A in FIG. 5 showing the structure of the thin-film magnetic head according to the embodiment in FIG. 4.
Figure 6B:
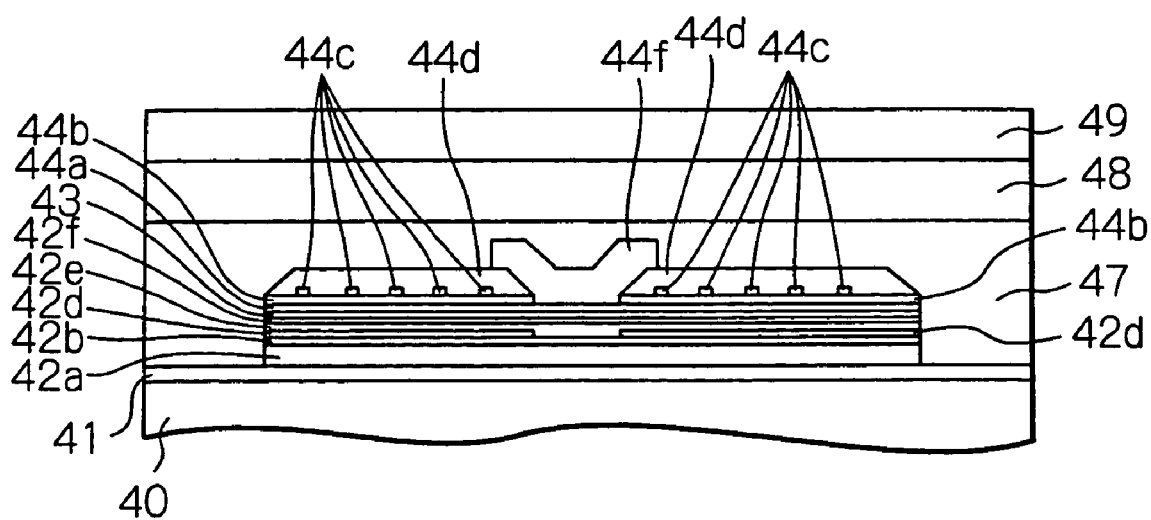

Next, the structure of the thin-film magnetic head according to the embodiment in FIG. 4 will be explained in more detail. FIG. 5 is a plain view of the thin-film magnetic head of the embodiment in FIG. 4 viewed through from the side of the element-formed surface of the slider substrate, FIG. 6a is a sectional view along a line A-A and FIG. 6a is a sectional view along a line B-B. The number of turns of the coil in FIGS. 6a and 6b is shown as if to be smaller than the number of turns in FIG. 5 for simplicity of drawings. The coil may be a two-layered coil or helical coil. FIG. 5 and FIG. 6a also schematically illustrate the structure of the heater 46 because this will be described in detail later.

In these figures, reference numeral 40 denotes a slider substrate made of, for example, AlTiC ($Al_2O_3$—TiC), etc., 41 denotes an insulating layer of approximately 0.05 μm to 10 μm in thickness made of, for example, $Al_2O_3$ laminated on the slider substrate 40, 42a denotes a lower shield layer of approximately 0.3 μm to 3 μm in thickness made of, for example, NiFe, NiFeCo, CoFe, FeN or FeZrN laminated on the insulating layer 41, 42b denotes a lower shield gap layer of approximately 0.005 μm to 0.5 μm in thickness made of, for example, $Al_2O_3$ or DLC laminated on the lower shield layer 42a, 42c denotes an MR layer made of, for example, CIP-GMR multilayer, CPP-GMR multilayer or TMR multilayer laminated on the lower shield gap layer 42b, 42d denotes an element lead conductor layer provided with a magnetic bias layer connected to both ends of the MR layer 42c, made of, for example, Cu, 42e denotes an upper shield gap layer of approximately 0.005 μm to 0.5 μm in thickness made of, for example, $Al_2O_3$ or DLC laminated on the MR layer 42c and element lead conductor layer 42d, and 42f denotes an upper shield layer of approximately 0.3 μm to 4 μm in thickness made of, for example, NiFe, NiFeCo, CoFe, FeN or FeZrN laminated on the upper shield gap layer 42e. The reproducing gap length which is the distance between the upper and lower shield layers 42f and 42a is approximately 0.03 μm to 1 μm.

Reference numeral 43 denotes an insulating layer of approximately 0.1 μm to 2.0 μm in thickness made of, for example, $Al_2O_3$ laminated on the upper shield layer 42f, 44a denotes a lower pole layer of approximately 0.3 μm to 3 μm in thickness made of, for example, NiFe, NiFeCo, CoFe, FeN or FeZrN laminated on the insulating layer 43, 44b denotes a magnetic gap layer of approximately 0.03 µm to 0.5 µM in thickness (equivalent to the recording gap length) made of, for example, $Al_2O_3$ or DLC laminated on the lower pole layer 44a, 44c denotes a coil layer of approximately 0.5 µm to 3 µm in thickness made of, for example, Cu laminated on the magnetic gap layer 44b, 44d denotes a coil insulating layer of approximately 0.1 µm to 5 µm in thickness made of, for example, hot cured resist layer covering the coil layer 44c, 44e denotes a coil lead conductor layer made of, for example, Cu or NiFe electrically connected to one end of the coil layer 44c, and 44f denotes an upper pole layer of approximately 0.5 µm to 5 µm in thickness made of, for example, NiFe, NiFeCo, CoFe, FeN or FeZrN acting as a magnetic pole and magnetic yoke together with the lower pole layer 44a. The insulating layer 43 need not necessarily be provided.

Reference numeral 47 denotes a first overcoat layer made of, for example, $Al_2O_3$ covering the formed MR effect element 42 and the inductive write head element 44, 46 denotes a heater formed on the first overcoat layer 47. Reference numeral 48 denotes a second overcoat layer made of, for example, AlN covering the entire heater 46. Reference numeral 49 denotes a third overcoat layer made of, for example, Si formed on the second overcoat layer 48.

Here, the first overcoat layer is preferably formed of one first material selected from a group made up of MgO, $Al_2O_3$, Mo, W, AlN, SiC, W—Cu, $SiO_2$, Si, $Si_3N_4$, SiAlON, $AlTiO_4$, BN and $ZrW_2O_8$ and the second overcoat layer is preferably formed of one second material having a smaller coefficient of thermal expansion than that of the first material and the third overcoat layer is preferably formed of one third material having a smaller coefficient of thermal expansion than that of the second material. Table 1 shows coefficients of thermal expansion of the materials in the above-described group.

TABLE 1

| Material | Coefficient of thermal expansion ($\times 10^{-6}/°$ C.) |
|---|---|
| MgO | 13 |
| $Al_2O_3$ | 6.9 to 8 |
| Mo | 3.7 to 5.3 |
| W | 4.5 |
| AlN | 3.8 to 4.5 |
| SiC | 3.7 to 4.5 |
| W—Cu | 4 |
| $SiO_2$ | 3.5 to 4.3 |
| Si | 3.6 |
| $Si_3N_4$ | 3 to 3.6 |
| SiAlON | 2.5 |
| $AlTiO_4$ | 0.8 |
| BN | −1.0 to −2 |
| $ZrW_2O_8$ | −8 to −5 |

As shown above, various materials can be used for the respective overcoat layers. Here, countermeasures in the case of poor adhesion between overcoat layers will be explained. For example, when the first overcoat layer 47 is made of $Al_2O_3$ and the second overcoat layer is made of AlN, adhesion between the two is actually not good. FIG. 7 is a sectional view showing a countermeasure in the case where adhesion between the overcoat layers is insufficient.

According to the figure, the end of the second overcoat layer 48 made of AlN does not reach the head end face 53 opposite to the PTR surface 51. The adhesion assist layer 54 covering this second overcoat layer 48 is also made of $Al_2O_3$ as in the case of the first overcoat layer 47 and adheres to the first overcoat layer 47 at an end portion of the head end face 53 side. This adhesion is very good because the two are made of the same material. As a result, providing this adhesion assist layer 54 assists the adhesion of the first and second overcoat layers and prevents peeling. In the mode of the overcoat layer shown in FIG. 7, the heater 46 is preferably provided in the first overcoat layer 47 as shown in the figure.

Figure 8:
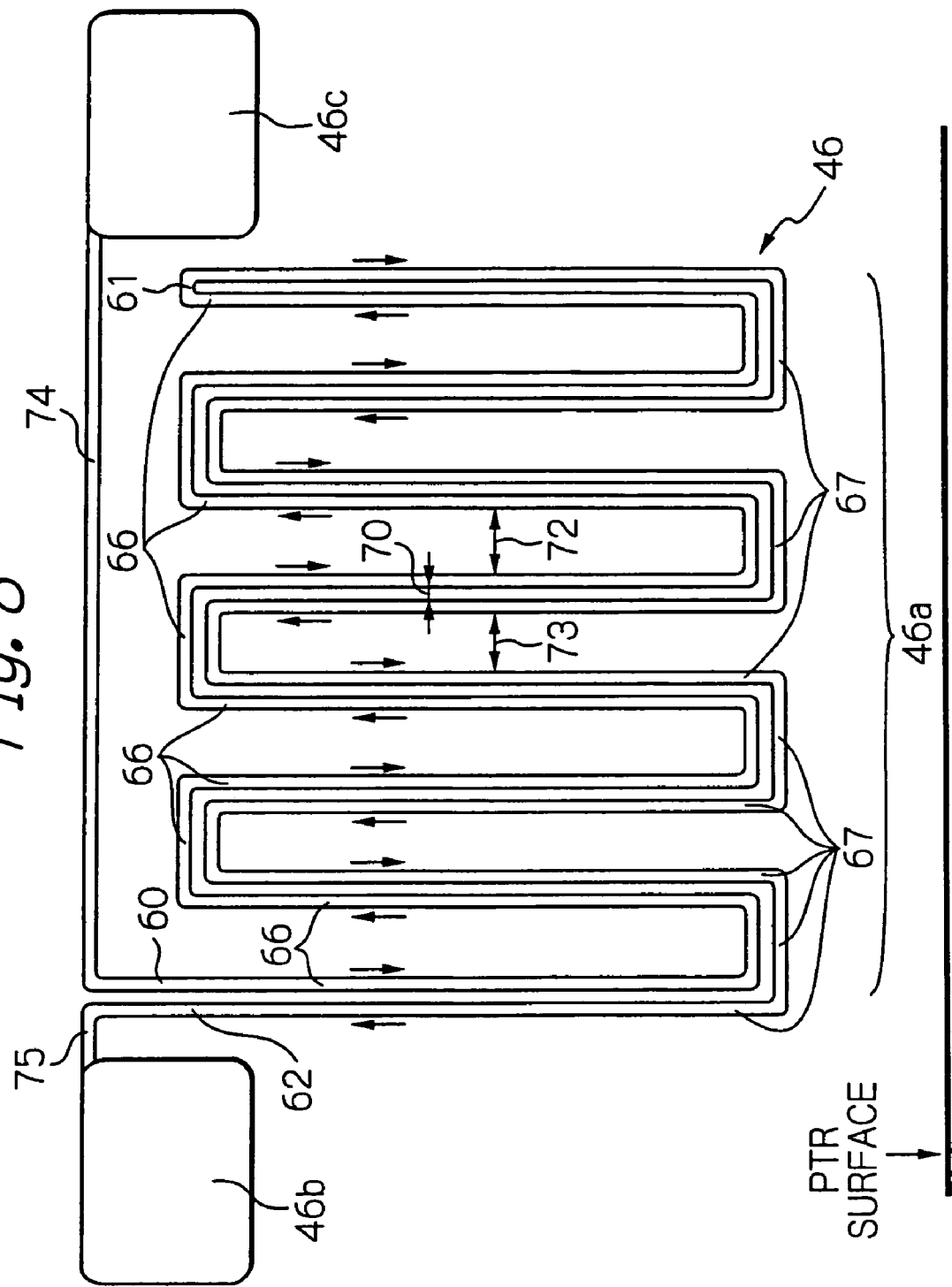
FIG. 8 is a plain view illustrating the structure of a heater of the thin-film magnetic head according to the embodiment in FIG. 4.
Figure 9:
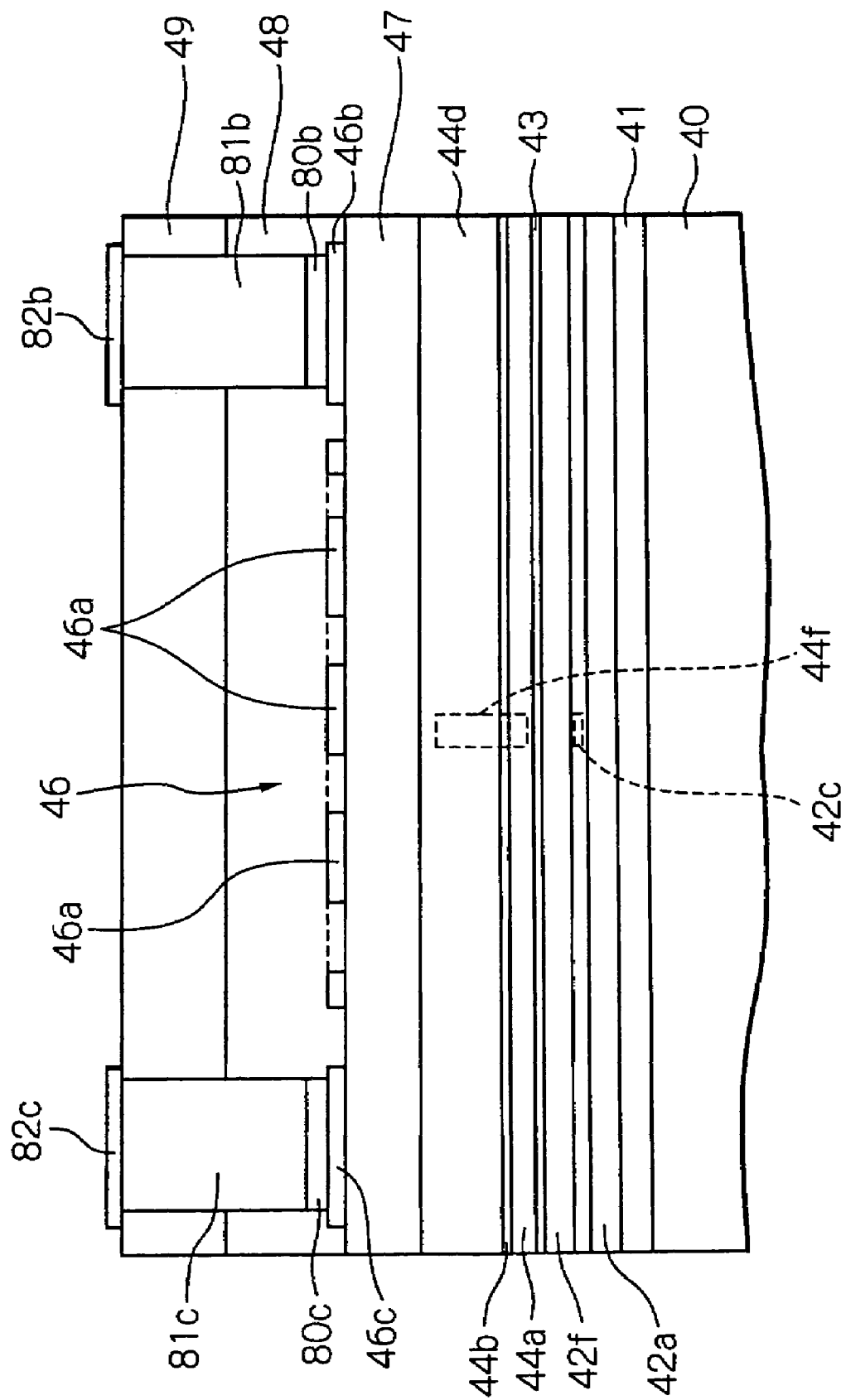
FIG. 9 is a sectional view along a line C-C in FIG. 5 showing the structure of electrode pads of the heater.

FIG. 8 illustrates the structure of the heater 46 of the thin-film magnetic head according to the embodiment in FIG. 4. Furthermore, FIG. 9 is a sectional view along a line C-C in FIG. 5 showing the structure of the electrode pads of the heater 46.

According to FIG. 8, the heater 46 includes a heat generating section 46a which consists of one line meandering inside the layer and leading electrodes 46b and 46c connected to both ends of the heat generating section 46a and constitutes a current path of a predetermined length.

More specifically, the heat generating section 46a consists of an up-line section 66 formed so as to meander in a square wave form from a predetermined starting point 60 to a turn-round point 61, a down-line section 67 formed so as to return from the turn-round point 61 to an end point 62 close to the starting point 60 meandering along the up-line section 66, a connection section 74 which connects the starting point 60 and a lead electrode 46c and a connection section 75 which connects the end point 62 and a lead electrode 46b. The distance 70 between the up-line section 66 and down-line section 67 formed so as to run along each other is set to be narrower than the distance 72 between the mutually facing parts of up-line section 66 and the distance 73 between the mutually facing parts of down-line section 67.

The heat generating section 46a has a thickness of, for example, approximately 100 nm to 5000 nm and is made of, for example, a material containing NiCu. The content of Ni in NiCu is, for example, approximately 15 to 60 atomic % and preferably 25 to 45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

Furthermore, the heat generating section 46a may also be made of a material containing NiCr. In this case, the content of Ni in NiCr is approximately 55 to 90 atomic % and preferably 70 to 85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heat generating section 46a may also be made of single Ta or a material containing Ta. Here, at least one of elements Al, Mn, Cu, Fe, Mo, Co, Rh, Si, Ir, Pt, Ti, Nb, Zr and Hf may also be included as an additive to this Ta. The content of the additive is preferably 5 atomic % or less.

The lead electrodes 46b and 46c may also be made of the same material as that of the heat generating section 46a.

According to FIG. 9, base electrode films 80b and 80c with conductivity are formed on the lead electrodes 46b and 46c respectively. Bumps 81b and 81c extending upward formed through electrolytic plating using these base electrode films 80b and 80c as electrodes are provided on these base electrode film 80b and 80c respectively. The base electrode films 80b and 80c, and bumps 81b and 81c are made of a conductive material such as Cu. The thickness of the base electrode films 80b and 80c is approximately 10 nm to 200 nm and the thickness of the bumps 81b and 81c is approximately 5 µm to 30 µm.

The top ends of the bumps 81b and 81c are exposed from the third overcoat layer 49 and pads 82b and 82c for the heater 46 are provided at these top ends. A current is supplied to the heater 46 through these pads 82b and 82c. Likewise, the MR effect element 42 and inductive write head element 44 are connected to the signal terminal electrodes 31 (FIG. 3), but the connection structure of these elements is not shown for simplicity of drawings.

FIGS. 10a to 10e are process drawings illustrating the manufacturing processes of the thin-film magnetic head according to the embodiment in FIG. 4 and show sectional views along the line A-A in FIG. 5.

Hereinafter, the manufacturing processes of the thin-film magnetic head according to the embodiment will be explained briefly with reference to the figures. First, as shown FIG. 10a, an insulating layer 41 is laminated on the substrate 40 using, for example, a sputtering technique. Then, the lower shield layer 42a is formed on the insulating layer 41 using, for example, a plating technique. Next, the lower shield gap layer 42b, the MR layer 42c, the element lead conductor layer 42d provided with the magnetic bias layer, and the upper shield gap layer 42e are formed using, for example, a sputtering technique. Next, the upper shield layer 42f is formed using, for example, a plating technique. Next, a planarizing layer 47a is formed behind these layers viewed from the PTR surface side, using, for example, a sputtering technique and chemical mechanical polish (CMP) technique. The formation of the MR effect element 42 is completed through the above-described processes.

Figure 10:
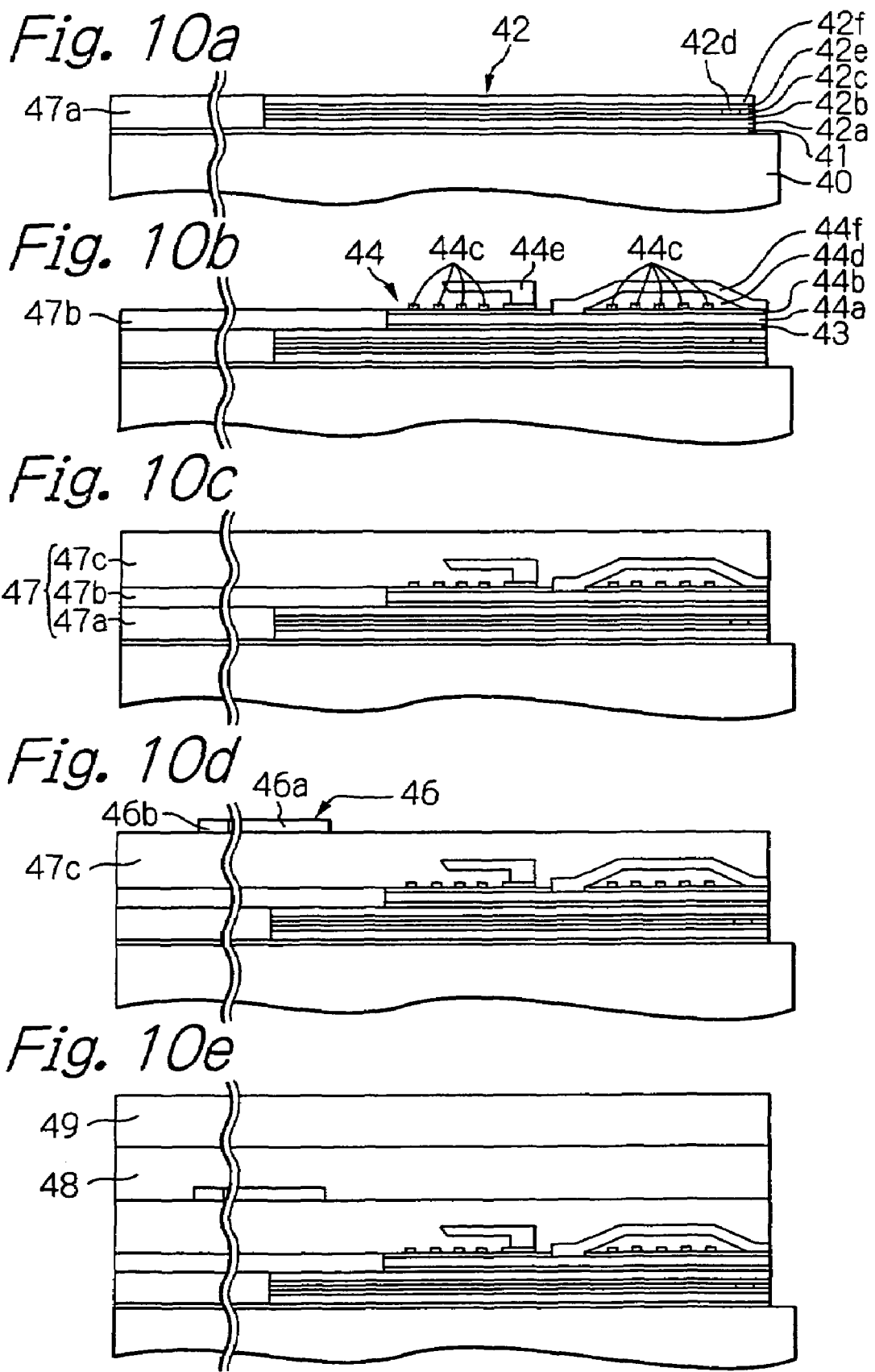
FIGS. 10a to 10e are process drawings illustrating the manufacturing processes of the thin-film magnetic head according to the embodiment in FIG. 4.

Next, as shown in FIG. 10b, the insulating layer 43, lower pole layer 44a and magnetic gap layer 44b are formed on the upper shield layer 42f using, for example, a sputtering technique and a planarizing layer 47b is formed behind these layers viewed from the PTR surface using, for example, a sputtering technique and CMP technique. Next, the coil layer 44c is formed according to a publicly known method using a photolithographic method and dry etching method, and the coil insulating layer 44d and upper pole layer 44f are formed on the magnetic gap layer 44b so as to cover the coil layer 44c. The formation of the inductive write head element 44 is completed through the above-described processes. Furthermore, in preparation for the formation of the heater 46 which is the next process, a flattened overcoat layer 47c is formed using, for example, a sputtering technique and CMP technique (FIG. 10c). Here, the planarizing layers 47a and 47b, and the overcoat layer 47c make up the first overcoat layer 47.

Next, as shown in FIG. 10d, the heat generating section 46a and lead electrodes 46b and 46c are formed at predetermined positions on the overcoat layer 47c using, for example, a sputtering technique. Next, as shown in FIG. 10e, a flattened second overcoat layer 48 covering the heater 46 is formed using, for example, a sputtering technique and CMP technique. Furthermore, a flattened third overcoat layer 49 is formed on the second overcoat layer 48 using, for example, a sputtering technique and CMP technique.

As described above, the surface of the top layer of each overcoat layer is flattened using a CMP technique, etc. However, when, for example, the second overcoat layer is formed of AlN having high hardness and low polishing rate, it is difficult to form a sufficiently flat surface even when a CMP is applied to the top surface of this layer. Thus, it is difficult to make, for example, this second overcoat layer the top layer. As a countermeasure for this, for example, by forming AlN as the second overcoat layer, forming an $Al_2O_3$ film thereupon and then applying a CMP to the top surface of the same layer, it is possible to flatten the top surface consequently. As another mode, it is also possible to form AlN as the second overcoat layer, flatten the top surface of the same layer through a CMP to a certain extent and then form a layer made of $Al_2O_3$ on the flattened surface.

Figure 11:
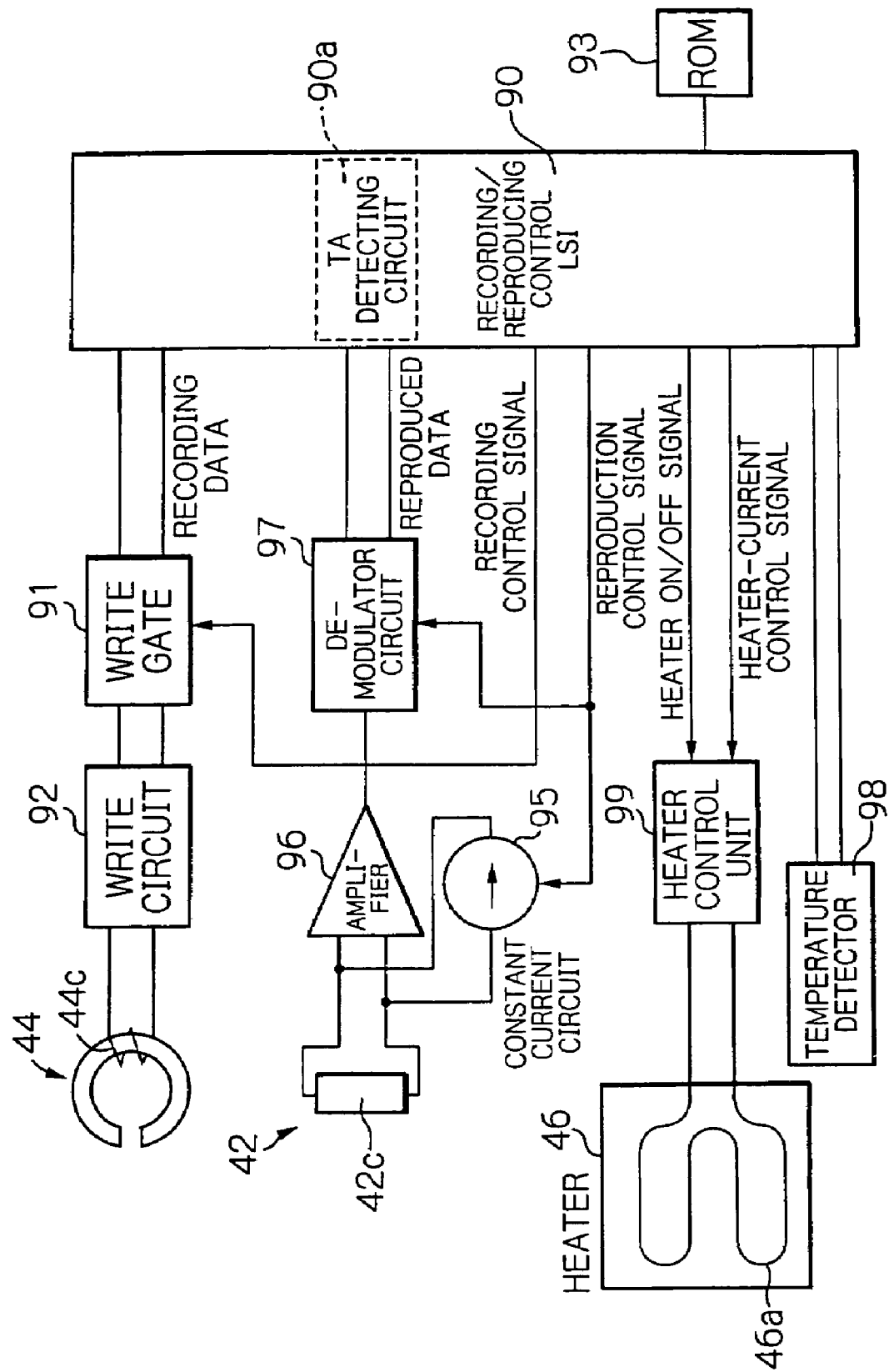
FIG. 11 is a block diagram showing the circuit structure of a recording/reproducing circuit of the magnetic disk drive apparatus according to the embodiment in FIG. 1.
Figure 12:
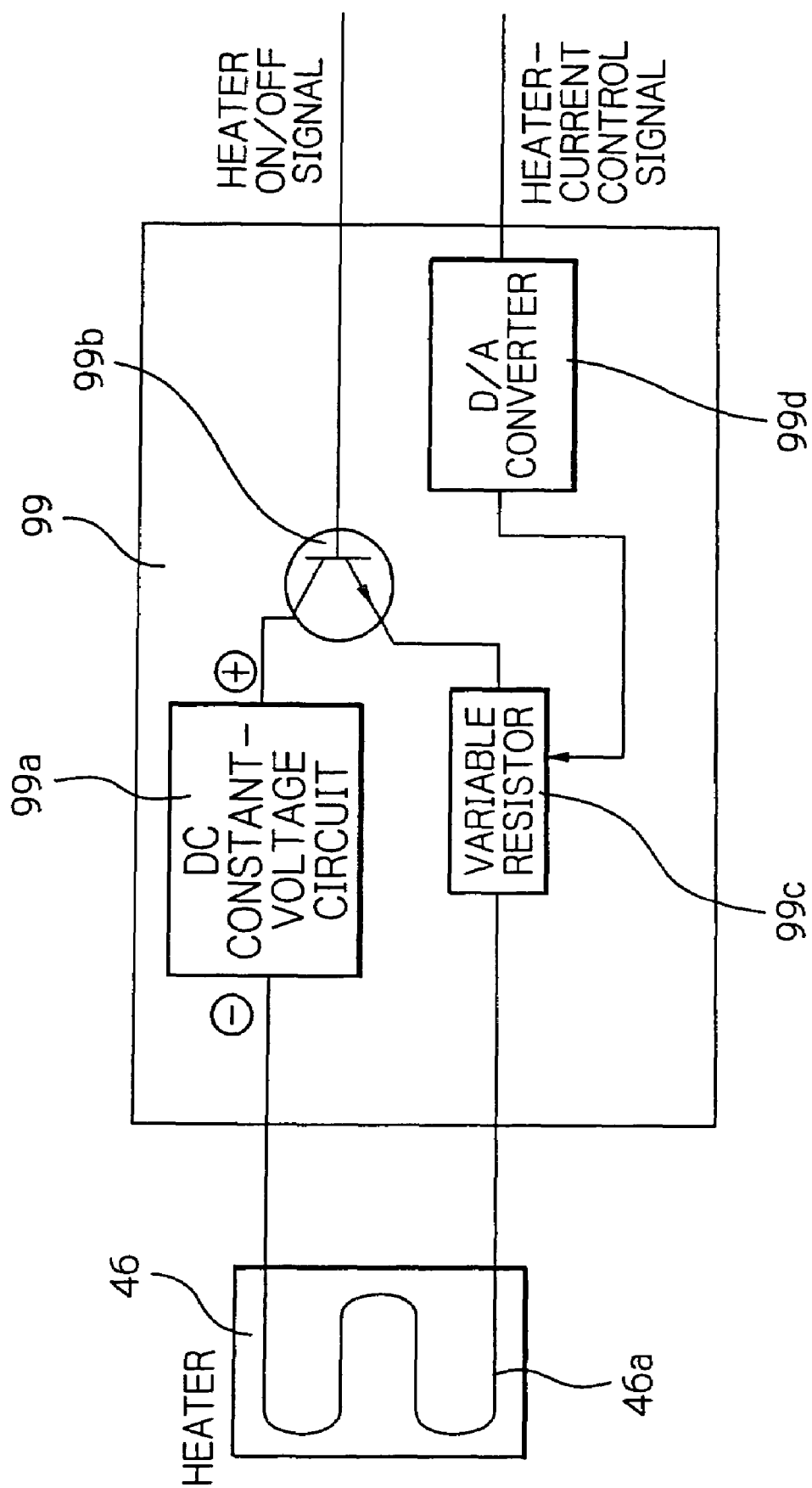
FIG. 12 is a block diagram showing the structure of a heater control circuit of the magnetic disk drive apparatus according to the embodiment in FIG. 1.

FIG. 11 is a block diagram showing the circuit structure of the recording/reproducing circuit 13 of the magnetic disk drive apparatus according to the embodiment in FIG. 1. Furthermore, FIG. 12 is a block diagram showing the structure of the heater control circuit of the magnetic disk drive apparatus according to the embodiment in FIG. 1.

In FIG. 11, reference numeral 90 denotes a recording/reproducing control LSI and includes a thermal asperity (TA) detecting circuit 90a. Reference numeral 91 denotes a write gate which receives recording data from the recording/reproducing control LSI 90, 92 denotes a write circuit, 93 denotes a ROM which stores a table, etc., for controlling current values to the heater, 95 denotes a constant current circuit which supplies a sense current to the MR effect element 42, 96 denotes an amplifier which amplifies the output voltage of the MR effect element 42, 97 denotes a demodulator circuit which outputs reproduced data to the recording/reproducing control LSI 90, 98 denotes a temperature detector, and 99 denotes a control circuit of the heater 46.

The recording data output from the recording/reproducing control LSI 90 is supplied to the write gate 91. The write gate 91 supplies recording data to the write circuit 92 only when a recording control signal output from the recording/reproducing control LSI 90 instructs a write operation. The write circuit 92 passes a write current to the coil layer 44c according to this recording data and records data on the magnetic disk 10 (FIG. 1) through the inductive write head element 44.

A constant current flows from the constant current circuit 95 into the MR layer 42c only when the reproduction control signal output from the recording/reproducing control LSI 90 instructs a read operation. The signal reproduced by this MR effect element 42 is amplified by the amplifier 96, demodulated by the demodulator circuit 97 and the reproduced data obtained is output to the recording/reproducing control LSI 90.

The heater control circuit 99 according to this embodiment has a structure shown in FIG. 12. That is, a series circuit made up of a direct-current (DC) constant-voltage circuit 99a, a switching transistor 99b and variable resistor 99c is connected to a heat generating section 46a of the heater 46. A heater ON/OFF signal output from the recording/reproducing control LSI 90 is supplied to the switching transistor 99b. Furthermore, a heater-current control signal output from the recording/reproducing control LSI 90 is converted to an analog signal at a D/A converter (digital-analog converter) 99d and supplied to the variable resistor 99c.

When the heater ON/OFF signal is an ON operation instruction, the switching transistor 99b turns ON and a current flows into the heat generating section 46a of the heater 46. The current value in this case is controlled by the variable resistor 99c to a value corresponding to the heater-current control signal converted to the analog signal.

Thus, it is possible to realize not only a current application to the heater linked with the recording/reproducing operation but also a more diversified current application mode by providing a heater ON/OFF signal and heater-current control signal system independently from the recording/reproducing operation control signal system.

In the actual operation, a current corresponding to a predetermined current application mode flows into the heat generating section 46a of the heater 46. Through this current, the heater 46 itself and its periphery are heated and thermally expanded, causing the inductive write head element 44 and the MR effect element 42 to protrude slightly in the direction toward the PTR surface 51. This allows $d_{MS}$ to be reduced only during a write operation and read operation. Thus, reducing $d_{MS}$ only during operation of the magnetic head element makes it possible to compensate a reduction in the write and/or read performance caused by a reduction of track width and deal with the weakening of magnetic fields corresponding to signals caused by downsizing of recording bits, without considerably increasing the probability that the slider may collide with the magnetic disk surface. This $d_{MS}$ value can be adjusted precisely by the heater-current control signal which controls the current flowing through the heat generating section 46a.

It is obvious that the circuit structure of the recording/reproducing circuit 13 is not limited to the one shown in FIG. 11 and FIG. 12. It is also possible to specify the write operation and read operation using a signal other than a recording control signal and reproduction control signal. Furthermore, it is desirable to cause the heater 46 to generate heat at least during both write operation and read operation, but it is also possible to cause the heater 46 to generate heat during either write operation or read operation or continuously during a predetermined period in which a write operation and read operation continue. Moreover, it is also possible to use not only DC but also AC or pulse current, etc., as the current flown into the heater 46.

An embodiment of a current application mode for the heater 46 will be explained below.

First, an initial setting of the power supplied to the heater for controlling $d_{MS}$ will be explained. The $d_{MS}$ value of the individual thin-film magnetic head generally varies. Thus, the AE component in the reproduced data on the innermost track of the magnetic disk is detected by the TA detecting circuit 90a, the heater 46 is energized up to the amount of current at which AE is beyond a reference range, and the amount of limit current is determined. This amount of current is recorded in the ROM 93. The reason that the innermost track is used is that $d_{MS}$ during a seek is smallest in the innermost radius and therefore the AE component on the innermost track can be a reference for the upper limit of the amount of current. Then, the amount of current corresponding to a desired $d_{MS}$ is set using a common "current vs. the amount of TPTP protrusion" table recorded in the ROM 93.

Next, a power supply during normal operation of the magnetic disk drive apparatus will be explained. First, with the heater 46 energized with the amount of current set as described above, a write and read are performed. Here, when the amount of AE generated is within a reference range, the operation is continued. When the amount of AE generated exceeds the reference range, the current is reduced by a predetermined unit and the amount of AE generated is monitored continuously. Thereafter, this cycle is repeated. In this case, if the amount of AE generated exceeds the reference range even after the predetermined number of repetitions, the flying state of the head may be unstable or it may be considered as a sign of a crash, and a flag of stopping operation is notified to the host CPU.

Then, temperature compensation of $d_{MS}$ will be explained. Since the slider flies hydrodynamically, $d_{MS}$ is affected by the temperature inside the apparatus. Furthermore, the amount of protrusion of the magnetic head element due to a TPTP phenomenon is also affected by the temperature inside the apparatus which constitutes a background. Therefore, a "temperature inside the apparatus vs. $d_{MS}$ change" table based on the characteristic of the temperature detector 98 (e.g., resistor type sensor) and the amount of TPTP protrusion is stored in the ROM 93 and the temperature is monitored by the temperature detector 98. According to the temperature inside the apparatus, the amount of current is adjusted with reference to this table and a certain $d_{MS}$ is secured.

Next, compensation of $d_{MS}$ according to other factors will be explained. A $d_{MS}$ value also fluctuates due to a variation in an atmospheric pressure or external vibration. However, there is normally no barometric sensor or vibration sensor inside the magnetic disk drive apparatus. Thus, the $d_{MS}$ value is adjusted based on the temperature inside the apparatus first. After this adjustment, if the amount of AE generated is still beyond the reference range, this is considered to be a $d_{MS}$ variation due to barometric variation or vibration, etc., and the current supplied to the heater is reduced by a first predetermined amount. Here, if the amount of AE generated is still beyond the reference range, the current is reduced by a second predetermined amount. Hereafter, this cycle is repeated. In this case, if the amount of AE generated exceeds the reference range even after the predetermined number of repetitions, this is considered to be attributable to an unstable flying state of the head or a sign of a crash and a flag of stopping operation, etc., is notified to the host CPU.

Furthermore, the $d_{MS}$ value also fluctuates depending on the position in the magnetic disk. This is because the disk-moving speed differs between the inner radius side and outer radius side even if the number of revolutions is the same. Thus, it is possible to perform fine adjustment of the current supplied to the heater and stabilize $d_{MS}$ according to the radius of the recording/reproducing position in the magnetic disk to realize constant $d_{MS}$.

Furthermore, in the usage for a vehicle-mounted apparatus such as a car navigation, it is possible to set current application to a save mode considering a strong vibration mode (frequent AE mode) and take a sufficiently large $d_{MS}$.

Influences of the coefficient of thermal expansion of each layer in the overcoat multilayer on the amount of swelling and swelling shape of the PTR surface generated by the heater 46 will be explained below.

In FIG. 4, the heater 46 is located in the overcoat multilayer made up of the first to third overcoat layers 47, 48 and 49 and supplies heat to each overcoat layer. As a result, each overcoat layer accumulates heat and thermally expands by an amount corresponding to the temperature rise. This thermal expansion causes the MR effect element 42 and inductive write head element 44, and these overcoat layers to be protruded in the direction toward the magnetic disk surface 52 and causes the PTR surface 51 to swell. In this case, since the coefficient of thermal expansion of the overcoat layer differs from one layer to another, the amount of swelling of the PTR surface changes depending on the distance from the element-formed surface of the slider substrate. The distribution of the amount of swelling of the PTR surface is determined by a combination of the thickness of each overcoat layer and the coefficient of thermal expansion in a thermally equilibrium condition.

Figure 13A:
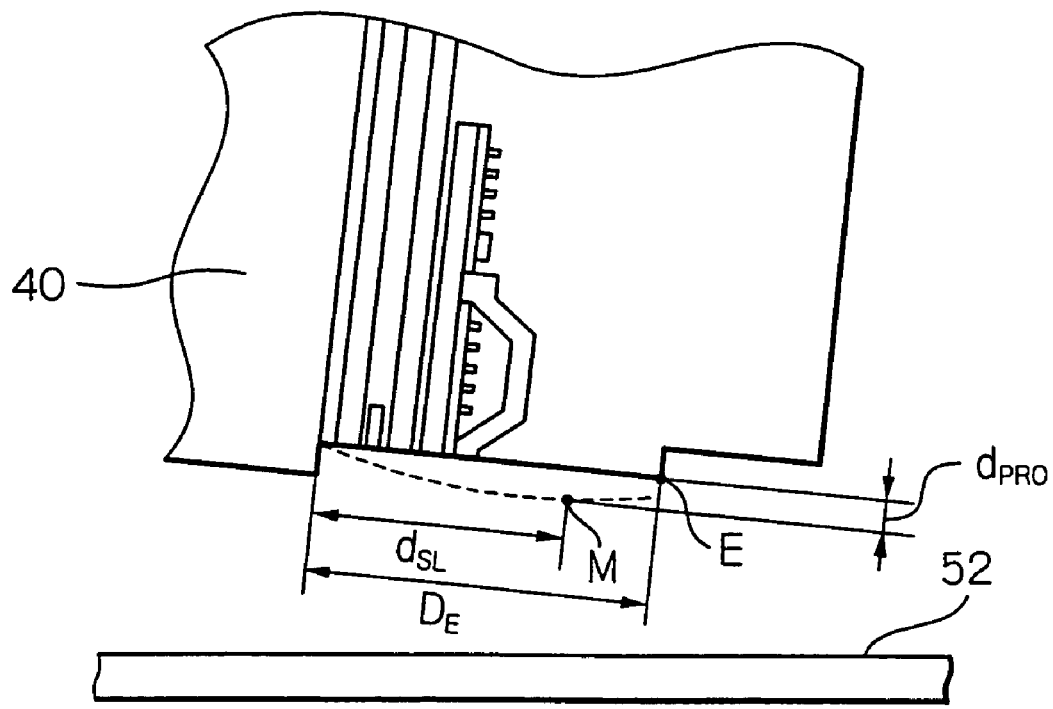
FIG. 13a is a schematic view defining a distance $D_{SL}$ from the element-formed surface of the slider substrate and the amount of swelling $d_{PRO}$ at a measuring point within the PTR surface.

FIG. 13a illustrates the definitions of the distance $d_{SL}$ from the element-formed surface of slider substrate 40 and the amount of swelling $d_{PRO}$ at a swelling-measuring point M within the PTR surface of the thin-film magnetic head of the embodiment in FIG. 4. Furthermore, FIG. 13b illustrates the relationship between $d_{SL}$ and $d_{PRO}$ in a predetermined heating condition.

In FIG. 13a, $d_{SL}$ is defined as the distance of the point M within the swelled PTR surface from the element-formed surface of the slider substrate 40. Also $d_{PRO}$ is defined as the amount of swelling at the point M relative to the PTR surface before the swelling. Here, the range of the PTR surface in which the swelled PTR surface may cause a crash extends to an edge E which is the recess starting point or a point at a distance $D_E$ from the element-formed surface. Therefore, the range of possible $d_{SL}$ values is $0 \leq d_{SL} \leq D_E$.

Figure 13B:
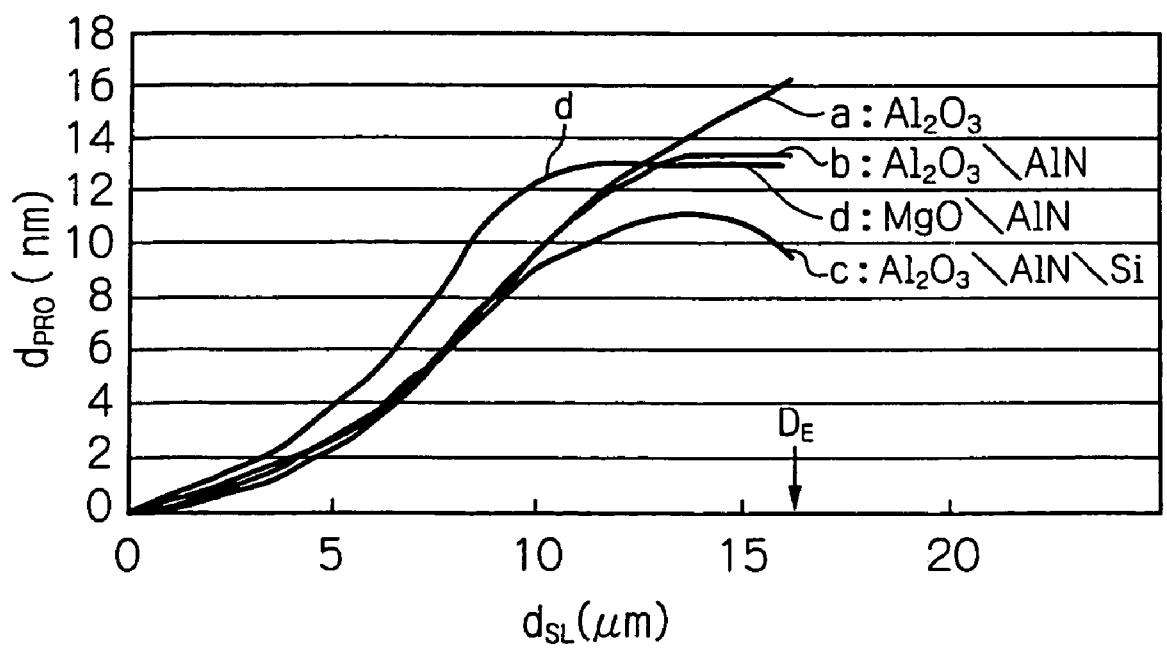
FIG. 13b is a graph showing a relationship between $D_{SL}$ and $d_{PRO}$ in a predetermined heating condition of the thin-film magnetic head according to the embodiment in FIG. 4.

In FIG. 13b, curve a shows the case of a conventional technology using only one overcoat layer made of $Al_2O_3$ (coefficient of thermal expansion: 6.9 to $8.0 \times 10^{-6}/°$ C.) of 32.0 μm in thickness. Curve b shows the case where $Al_2O_3$ of 17.0 μm in thickness is used for the first overcoat layer and AlN (3.8 to $4.5 \times 10^{-6}/°$ C.) of 15.0 μm in thickness having a smaller coefficient of thermal expansion than $Al_2O_3$ is used for the second overcoat layer. Furthermore, curve c shows the case where $Al_2O_3$ of 17.0 μm in thickness, AlN of 5.0 μm in thickness and Si ($3.6 \times 10^{-6}$/° C.) of 10.0 μm in thickness having a smaller coefficient of thermal expansion than those of $Al_2O_3$ and AlN are used as the first, second and third overcoat layers respectively. Furthermore, curve d shows MgO ($13 \times 10^{-6}$/° C.) of 17.0 μm in thickness having a greater coefficient of thermal expansion than that of $Al_2O_3$ is used as the first overcoat layer and AlN of 15.0 μm in thickness is used as the second overcoat layer. In all cases, the whole thickness of the overcoat multilayer is 32.0 μm. Furthermore, the coefficient of thermal expansion decreases in order of the first, second and third overcoat layers. $d_{PRO}$ shows a simulation value. In this case, the heater is positioned in the second overcoat layer where it contacts the first overcoat layer. DE is set to be 17.0 μm.

In the case of curve a, $d_{PRO}$ increases together with $d_{SL}$. Therefore, the PTR surface swells most at the edge E. In contrast, in curve b, $d_{PRO}$ increases together with $d_{SL}$ as in the case of curve a, but the increase peaks out at approximately 14 μm of $d_{SL}$ and then $d_{PRO}$ settles to a value around 13.3 nm. As a result, the swelling is reduced by 2.8 nm compared to curve a at the edge E corresponding to the maximum probability of crashes when the recessed surface is taken into consideration. That is, using the overcoat layer in such a two-layer structure can reduce the probability of crashes at the edge E with the magnetic disk surface.

Furthermore, in curve c, $d_{PRO}$ increases together with $d_{SL}$ as in the case of curve a, but the rate of increase starts to decrease when $d_{SL}$ is approximately 9 μm. Then, when $d_{SL}$ is approximately 13 μm, $d_{PRO}$ reaches a peak value of approximately 11.1 nm. At the edge E, $d_{PRO}$ further decreases down to approximately 9.4 nm. Therefore, compared to curve a, the swelling is reduced by 5.0 nm at the peak position and by 6.7 nm at the edge E. That is, using the overcoat multilayer with such a three-layer structure changes the swelling shape of the PTR surface, realizes the shape with the edge E recessed from the peak, and can thereby reduce the probability of crashes.

Furthermore, in curve d, $d_{PRO}$ increases together with $d_{SL}$ as in the case of a, but the rate of increase is greater than curves a, b and c. Then, $d_{PRO}$ peaks out when $d_{SL}$ is approximately 11 μm and then settles to a value of approximately 13.0 nm. As a result, the swelling is suppressed by 3.1 nm compared to curve a at the edge E. The swelling shape of the PTR surface obtained here is clearly different from curve b in the same two-layer structure. In this way, changing the coefficient of thermal expansion of each layer in the overcoat multilayer can change the swelling shape of the PTR surface.

As shown above, using the above-described overcoat multilayer makes it possible to set the swelled PTR surface to a predetermined shape and realize the shape with little protrusion in the area close to the trailing edge. This reliably reduces the probability of crashes of the area close to the trailing edge with the magnetic disk surface. This swelling shape can be freely designed using the coefficient of thermal expansion of the material forming of each overcoat layer and the thickness of each overcoat layer as parameters, and therefore it is possible to select an optimal condition to avoid crashes while suppressing $d_{MS}$ to a small value.

In the above-described embodiment, the number of layers of the overcoat multilayer is 2 or 3, but it is obvious that a reliable and stable crash prevention characteristic can be likewise obtained even when the number of layers is 4 or more. That is, if each material of 4 or more overcoat layers is selected in such a way that the coefficient of thermal expansion of each overcoat layer monotonously decreases from the slider substrate side, it is possible to suppress the swelling in the area close to the trailing edge due to a TPTP phenomenon which may cause crashes.

Furthermore, by causing the sputtering condition, etc., during the overcoat layer formation to change continuously, it is also possible to form an overcoat layer in which the coefficient of thermal expansion continuously decreases as the distance from the element-formed surface of the slider substrate increases or the coefficient of thermal expansion becomes a monotonously decreasing function with respect to the coordinates in the layer thickness direction. This embodiment is equivalent to the case where the thickness of the overcoat multilayer is fixed and the number of overcoat layers is set to quite a large number.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
   a substrate;
   at least one magnetic head element formed on said substrate;
   an overcoat multilayer made up of a plurality of overcoat layers, formed on said substrate so as to cover said at least one magnetic head element; and
   at least one heating element to be heated at least during operation of said at least one magnetic head element,
   said at least one heating element provided in said overcoat multilayer,
   at least an overcoat layer located farthest from said substrate in said overcoat multilayer being formed on a flattened surface of another overcoat layer, and
   a coefficient of thermal expansion of said overcoat layer located farthest from said substrate in said overcoat multilayer being smaller than a coefficient of thermal expansion of an overcoat layer located closest to said substrate in said overcoat multilayer.

2. The thin-film magnetic head as claimed in claim 1, wherein a coefficient of thermal expansion of any of said plurality of overcoat layers is equal to or greater than a coefficient of thermal expansion of any other of said plurality of overcoat layers further from said substrate.

3. The thin-film magnetic head as claimed in claim 1, wherein said overcoat layers are stacked in descending order of coefficients of thermal expansion from said substrate side in said overcoat multilayer.

4. The thin-film magnetic head as claimed in claim 1, wherein each of said overcoat layers is formed of one material selected from a group made up of MgO, $Al_2O_3$, Mo, W, AlN, SiC, W—Cu, $SiO_2$, Si, $Si_3N_4$, SiAlON, $AlTiO_4$, BN and $ZrW_2O_8$.

5. The thin-film magnetic head as claimed in claim 1, wherein said overcoat multilayer is made up of two overcoat layers.

6. The thin-film magnetic head as claimed in claim 1, wherein said at least one heating element is provided in an overcoat layer closest to said substrate in said overcoat multilayer.

7. The thin-film magnetic head as claimed in claim 6, wherein said at least one heating element is provided at a position opposite to an air bearing surface in relation to said at least one magnetic head element.

8. The thin-film magnetic head as claimed in claim 1, wherein an adhesion assist layer is provided so as to cover said overcoat multilayer, and adheres to an overcoat layer closest to said substrate at an end portion on the side of a head end face opposite to an air bearing surface.

9. The thin-film magnetic head as claimed in claim 8, wherein said adhesion assist layer is made of the same material as said overcoat layer closest to said substrate.

10. A head gimbal assembly provided with a thin-film magnetic head comprising:
   a substrate;
   at least one magnetic head element formed on said substrate;
   an overcoat multilayer made up of a plurality of overcoat layers, formed on said substrate so as to cover said at least one magnetic head element; and
   at least one heating element to be heated at least during operation of said at least one magnetic head element,
   said at least one heating element provided in said overcoat multilayer,
   at least an overcoat layer located farthest from said substrate in said overcoat multilayer being formed on a flattened surface of another overcoat layer, and
   a coefficient of thermal expansion of said overcoat layer located farthest from said substrate in said overcoat multilayer being smaller than a coefficient of thermal expansion of an overcoat layer located closest to said substrate in said overcoat multilayer,
   said head gimbal assembly comprising:
   trace conductors for transmitting signals to/from said at least one magnetic head element of said thin-film magnetic head;
   lead wires for supplying currents to said at least one heating element of said thin-film magnetic head; and
   a support mechanism supporting said thin-film magnetic head.

11. The head gimbal assembly as claimed in claim 10, wherein a coefficient of thermal expansion of any of said plurality of overcoat layers is equal to or greater than a coefficient of thermal expansion of any other of said plurality of overcoat layers further from said substrate.

12. The head gimbal assembly as claimed in claim 10, wherein said overcoat layers are stacked in descending order of coefficients of thermal expansion from said substrate side in said overcoat multilayer.

13. The head gimbal assembly as claimed in claim 10, wherein each of said overcoat layers is made of one material selected from a group made up of MgO, $Al_2O_3$, Mo, W, AlN, SiC, W—Cu, $SiO_2$, Si, $Si_3N_4$, SiAlON, $AlTiO_4$, BN and $ZrW_2O_8$.

14. The head gimbal assembly as claimed in claim 10, wherein said overcoat multilayer is made up of two overcoat layers.

15. The head gimbal assembly as claimed in claim 10, wherein said at least one heating element is provided in an overcoat layer closest to said substrate in said overcoat multilayer.

16. The head gimbal assembly as claimed in claim 15, wherein said at least one heating element is provided at a position opposite to an air bearing surface in relation to said at least one magnetic head element.

17. The head gimbal assembly as claimed in claim 10, wherein an adhesion assist layer is provided so as to cover said overcoat multilayer, and adheres to an overcoat layer closest to said substrate at an end portion on the side of a head end face opposite to an air bearing surface.

18. The head gimbal assembly as claimed in claim 17, wherein said adhesion assist layer is made of the same material as said overcoat layer closest to said substrate.

19. A magnetic disk drive apparatus provided with at least one head gimbal assembly provided with a thin-film magnetic head comprising:
   a substrate;
   at least one magnetic head element formed on said substrate;
   an overcoat multilayer made up of a plurality of overcoat layers, formed on said substrate so as to cover said at least one magnetic head element; and
   at least one heating element to be heated at least during operation of said at least one magnetic head element,
   said at least one heating element provided in said overcoat multilayer,
   at least an overcoat layer located farthest from said substrate in said overcoat multilayer being formed on a flattened surface of another overcoat layer, and
   a coefficient of thermal expansion of said overcoat layer located farthest from said substrate in said overcoat multilayer being smaller than a coefficient of thermal expansion of an overcoat layer located closest to said substrate in said overcoat multilayer,
   said head gimbal assembly comprising:
   trace conductors for transmitting signals to/from said at least one magnetic head element of said thin-film magnetic head;
   lead wires for supplying currents to said at least one heating element of said thin-film magnetic head; and
   a support mechanism supporting said thin-film magnetic head,
   said magnetic disk drive apparatus comprising a current control means for controlling currents to be supplied to said at least one heating element.

20. The magnetic disk drive apparatus as claimed in claim 19, wherein a coefficient of thermal expansion of any of said plurality of overcoat layers is equal to or greater than a coefficient of thermal expansion of any other of said plurality of overcoat layers further from said substrate.

21. The magnetic disk drive apparatus as claimed in claim 19, wherein said overcoat layers are stacked in descending order of coefficients of thermal expansion from said substrate side in said overcoat multilayer.

22. The magnetic disk drive apparatus as claimed in claim 19, wherein each of said overcoat layers is formed of one material selected from a group made up of MgO, $Al_2O_3$, Mo, W, AlN, SiC, W—Cu, $SiO_2$, Si, $Si_3N_4$, SiAlON, $AlTiO_4$, BN and $ZrW_2O_8$.

23. The magnetic disk drive apparatus as claimed in claim 19, wherein said overcoat multilayer is made up of two overcoat layers.

24. The magnetic disk drive apparatus as claimed in claim 19, wherein said at least one heating element is provided in an overcoat layer closest to said substrate in said overcoat multilayer.

25. The magnetic disk drive apparatus as claimed in claim 24, wherein said at least one heating element is provided at a position opposite to an air bearing surface in relation to said at least one magnetic head element.

26. The magnetic disk drive apparatus as claimed in claim 19, wherein said at least one magnetic head element includes a giant magnetoresistive effect read head element or a tunnel magnetoresistive effect read head element.

27. The magnetic disk drive apparatus as claimed in claim 19, wherein said current control means is a control means for supplying currents to said at least one heating element at least during operation of said at least one magnetic head element.

28. The magnetic disk drive apparatus as claimed in claim 19, wherein said current control means comprises a signal system for controlling said at least one heating element, and said signal system controls currents supplied to said at least one heating element independently from operations of a signal system for controlling operations of said at least one magnetic head element.

29. The magnetic disk drive apparatus as claimed in claim 19, wherein said current control means comprises a detecting means for detecting an acoustic emission component included in a reproduced data signal from said at least one magnetic head element and controls currents supplied to said at least one heating element according to the amount of said acoustic emission component detected by said detecting means.

30. The magnetic disk drive apparatus as claimed in claim 19, wherein said current control means comprises a temperature detecting means for detecting a temperature inside said magnetic disk drive apparatus and controls currents supplied to said at least one heating element according to an degree of said temperature detected by said temperature detecting means.

31. The magnetic disk drive apparatus as claimed in claim 19, wherein an adhesion assist layer is provided so as to cover said overcoat multilayer, and adheres to an overcoat layer closest to said substrate at an end portion on the side of a head end face opposite to an air bearing surface.

32. The magnetic disk drive apparatus as claimed in claim 31, wherein said adhesion assist layer is made of the same material as said overcoat layer closest to said substrate.

* * * * *